United States Patent
Higginbotham et al.

(10) Patent No.: US 9,791,210 B2
(45) Date of Patent: Oct. 17, 2017

(54) SYSTEMS AND METHODS FOR RECOVERING HELIUM FROM FEED STREAMS CONTAINING CARBON DIOXIDE

(75) Inventors: Paul Higginbotham, Surrey (GB); Vincent White, Surrey (GB); John Eugene Palamara, Macungie, PA (US)

(73) Assignee: Air Products and Chemicals, Inc., Allentown, PA (US)

(*) Notice: Subject to any disclaimer, the term of this patent is extended or adjusted under 35 U.S.C. 154(b) by 556 days.

(21) Appl. No.: 13/564,871

(22) Filed: Aug. 2, 2012

(65) Prior Publication Data
US 2014/0033764 A1    Feb. 6, 2014

(51) Int. Cl.
*F25J 3/02*      (2006.01)
*B01D 53/00*    (2006.01)
*F25J 3/06*      (2006.01)

(52) U.S. Cl.
CPC ............ *F25J 3/029* (2013.01); *B01D 53/002* (2013.01); *F25J 3/0209* (2013.01); *F25J 3/0266* (2013.01); *F25J 3/061* (2013.01); *F25J 3/067* (2013.01); *F25J 3/069* (2013.01); B01D 2256/18 (2013.01); B01D 2257/504 (2013.01); F25J 2200/02 (2013.01); F25J 2205/02 (2013.01); F25J 2205/04 (2013.01); F25J 2205/30 (2013.01); F25J 2205/40 (2013.01); F25J 2205/60 (2013.01); F25J 2205/82 (2013.01); F25J 2210/04 (2013.01); F25J 2235/80 (2013.01); F25J 2245/02 (2013.01); F25J 2270/02 (2013.01); Y02C 10/12 (2013.01)

(58) Field of Classification Search
CPC ....... F25J 3/020266; F25J 3/029; F25J 3/0266
USPC .............................. 62/618, 620, 624, 626, 636
See application file for complete search history.

(56) References Cited

U.S. PATENT DOCUMENTS

| | | | | |
|---|---|---|---|---|
| 2,551,399 | A | * | 5/1951 | Abe Silverberg ............... 62/625 |
| 3,010,286 | A | * | 11/1961 | Baker et al. .................... 62/632 |
| 3,021,682 | A | * | 2/1962 | Baker et al. .................... 62/632 |
| 3,355,902 | A | * | 12/1967 | Crawford et al. .............. 62/639 |
| 3,653,220 | A | | 4/1972 | Foster et al. |
| 3,740,962 | A | | 6/1973 | Fan |
| 3,815,376 | A | * | 6/1974 | Lofredo et al. ................. 62/639 |

(Continued)

FOREIGN PATENT DOCUMENTS

| | | | |
|---|---|---|---|
| DE | 102008007925 A1 | 8/2009 | |
| DE | 102008059011 | * 5/2010 | ............ F25J 3/0209 |
| WO | 2010060533 A1 | 6/2010 | |

OTHER PUBLICATIONS

Schmidt, DE102008059011TRANS (English Translation), May 2010.*

*Primary Examiner* — Justin Jonaitis
*Assistant Examiner* — Eric Ruppert
(74) *Attorney, Agent, or Firm* — Amy Carr-Trexler

(57) ABSTRACT

Systems and methods are provided for recovering helium from a feed comprising helium, carbon dioxide, and at least one intermediate component having a volatility between those of helium and carbon dioxide. In particular, processes of the present invention comprise separating the carbon dioxide and the components of intermediate volatility from the helium at a temperature greater than −82.7° C. to form a helium-rich product stream, wherein the concentration of at least one of the intermediate components in the helium-rich product stream is lower than its concentration in the feed stream, and wherein at least part of the separation is effected by contacting a vapor with a liquid.

16 Claims, 7 Drawing Sheets

(56) References Cited

U.S. PATENT DOCUMENTS

| | | | | |
|---|---|---|---|---|
| 3,850,593 A | * | 11/1974 | Beaujean et al. | 62/625 |
| 4,238,211 A | * | 12/1980 | Stuart | 62/639 |
| 4,602,477 A | * | 7/1986 | Lucadamo | 62/624 |
| 4,701,201 A | | 10/1987 | Hanson | |
| 4,717,407 A | * | 1/1988 | Choe | B01D 53/229 |
| | | | | 210/500.21 |
| 5,329,775 A | * | 7/1994 | Fiedler et al. | 62/627 |
| 5,771,714 A | | 6/1998 | Emley et al. | |
| 5,927,103 A | * | 7/1999 | Howard | 62/620 |
| 2006/0107691 A1 | * | 5/2006 | Howard | 62/617 |
| 2008/0066494 A1 | * | 3/2008 | Howard | 62/639 |
| 2008/0190025 A1 | | 8/2008 | Stinson | |
| 2011/0265647 A1 | * | 11/2011 | Find et al. | 95/153 |

* cited by examiner

SYSTEMS AND METHODS FOR RECOVERING HELIUM FROM FEED STREAMS CONTAINING CARBON DIOXIDE

BACKGROUND OF THE INVENTION

The present invention provides systems and methods for obtaining helium-rich product fractions from feed streams containing carbon dioxide.

There are many high-pressure gas fields that supply carbon dioxide-rich gas streams for the oil and gas industry. In general, the carbon dioxide ($CO_2$) content of these streams is greater than 50% by volume, and usually from about 60 to about 98 vol %. In addition, the gas mixture typically contains methane (for example from about 0.1 to about 20 vol %), nitrogen (up to about 30 vol %), small amounts of argon, hydrogen, and heavier hydrocarbons, and helium fractions up to about 1% by volume. These $CO_2$-rich gas streams have been used in the industry for enhanced oil recovery (EOR), and the associated hydrocarbons are optionally recovered when economically justified.

Helium is used in a variety of applications, including for example cryogenic processes, pressurizing and purging systems, maintaining controlled atmospheres, and welding. Since helium is becoming increasingly scarce, however, new ways to recover helium are being considered, including recovering the small amounts of helium contained in such $CO_2$-rich streams. In order to do so, a product stream must be recovered that has a sufficient composition and pressure for further treatment in a helium purification and liquefaction process. The recovered helium-rich product fraction, then, should have a helium content of at least about 35 vol % in nitrogen, preferably greater than 50 vol %, with only trace amounts of $CO_2$.

Because the triple point of $CO_2$ is $-56.6°$ C., purification processes that rely on phase separation carried out by means of a low temperature distillation process can perform only a coarse separation of the $CO_2$ from a feed gas mixture. $CO_2$ separation can also be carried out by other methods, such as amine scrubbing, methanol scrubbing, or adsorption processes such as pressure swing adsorption (PSA), but an improved process that maximizes recovery of helium and $CO_2$ and minimizes power requirements is commercially and economically desirable.

U.S. Pat. No. 3,653,220 describes recovery of helium from a natural gas-containing feed in which $CO_2$ in the feed (approximately 22 vol %) is removed using a $CO_2$ PSA upstream of a low temperature separation unit. Recovering helium from a natural gas feed, however, is simpler than recovering helium from a feed having greater than 50 vol % $CO_2$, because cryogenic separation may be employed earlier in the recovery process to produce pure helium.

U.S. Pat. No. 3,740,962 is similar to the previous process, except that $CO_2$ is removed from a natural gas feed using an amine scrubbing unit, and crude helium is then separated from a predominantly methane stream via a cryogenic separation process using external refrigerants to condense the feed gas.

WO 2010/060533 describes bulk separation of $CO_2$ from a helium-containing natural $CO_2$ source using a low temperature separation process, with further downstream helium purification. DE 102008007925 describes recovery of helium from a feed containing helium, nitrogen, and methane by partial condensation of the feed and subsequent separation into helium-rich and helium-lean fractions.

The present invention provides an improved process for recovering helium from a $CO_2$ feed while preferably recovering at least 98% of the helium in the feed to the helium product, preferably recovering at least 99% of the $CO_2$ in the feed back to the pipeline, minimizing power requirements, and meeting the $CO_2$ composition requirements of a downstream pipeline by optionally rejecting nitrogen within the helium recovery process.

BRIEF SUMMARY OF THE INVENTION

The present invention provides systems and methods for recovering helium from a feed comprising helium, carbon dioxide, and at least one intermediate component having a volatility between those of helium and carbon dioxide. In particular, processes of the present invention comprise separating the carbon dioxide and the components of intermediate volatility from the helium at a temperature greater than $-82.7°$ C. to form a helium-rich product stream, wherein the concentration of at least one of the intermediate components in the helium-rich product stream is lower than its concentration in the feed stream, and wherein at least part of the separation is effected by contacting a vapor with a liquid. Systems of the present invention for recovering helium from a feed stream comprising helium and at least 50 mol % $CO_2$ comprise: (i) a first separator comprising a distillation column, configured to separate the feed stream into a first helium-enriched stream and a first $CO_2$-enriched stream, wherein at least part of the feed stream enters the distillation column at an intermediate location; (ii) one or more heat exchangers configured to cool the feed stream and heat the first helium-enriched and first $CO_2$-enriched streams; (iii) a second separator configured to separate a portion of the first $CO_2$-enriched stream into a liquid fraction and a vapor fraction and recycle the liquid fraction to the top of the distillation column; (iv) a compressor configured to compress the non-separated portion of the first $CO_2$-enriched stream and the vapor fraction of the separated portion of the first $CO_2$-enriched stream to form a $CO_2$-rich product stream; and optionally (v) a third separator configured to separate the first helium-enriched stream to form a helium-rich product stream and a helium-lean stream.

The systems and methods of the present invention can provide greater than 98% recovery of the helium in the feed stream to a helium product stream and preferably greater than 99% recovery of the $CO_2$ in the feed stream to a $CO_2$ product stream. Further, systems and methods of the present invention may be configured to minimize power requirements, minimize equipment size, and meet downstream $CO_2$ pipeline composition requirements through the use of an intermediate column reboiler, a $CO_2$ wash stream fed to the top of the distillation column, and/or rejection of nitrogen from the process.

DETAILED DESCRIPTION OF THE INVENTION

Figure 1:
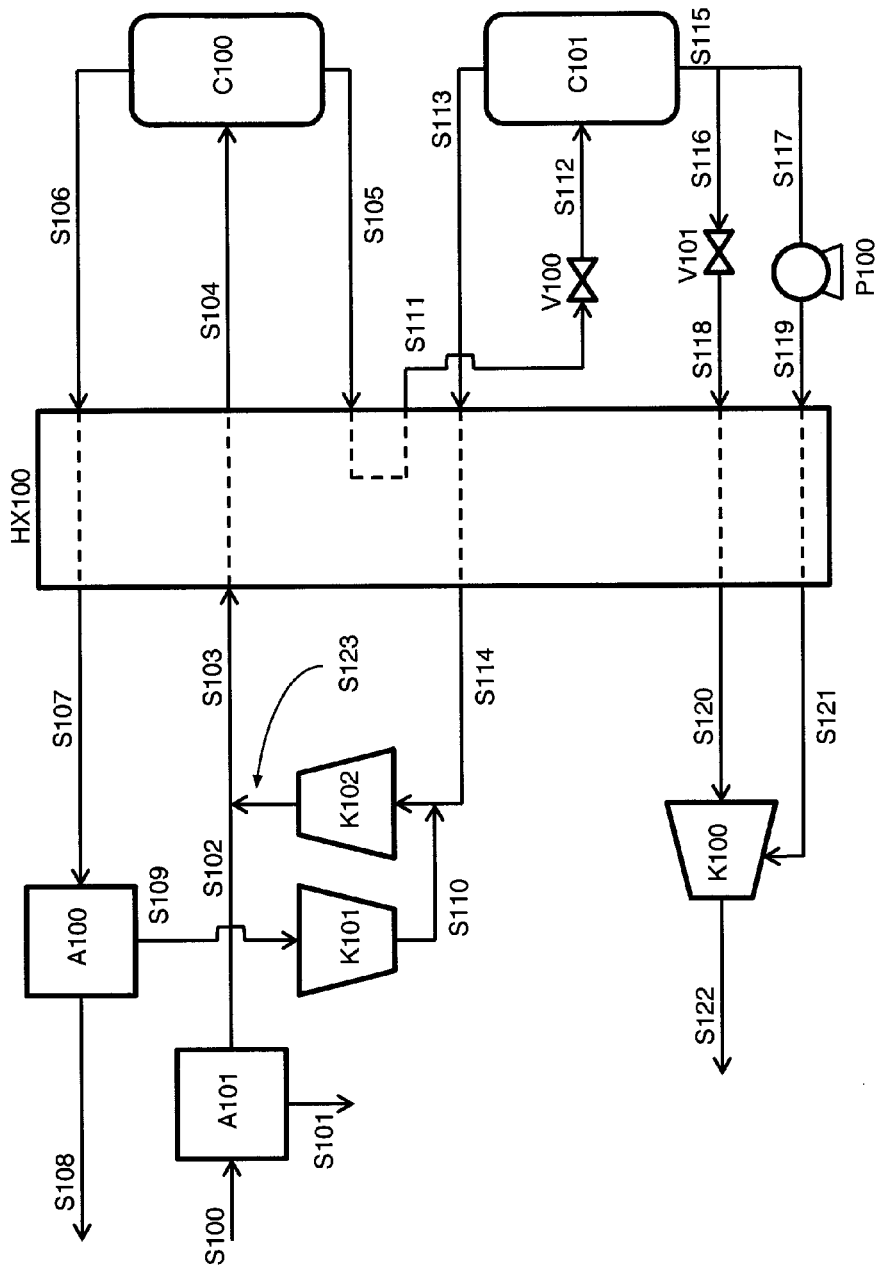
FIG. 1 is a schematic diagram of a helium recovery system incorporating multiple flash separators.

To aid in describing the invention, directional terms may be used in the specification and claims to describe portions of the present invention (e.g., upper, lower, left, right, etc.). These directional terms are merely intended to assist in describing and claiming the invention and are not intended to limit the invention in any way. In addition, reference numerals that are introduced in the specification in association with a drawing figure may be repeated in one or more subsequent figures without additional description in the specification in order to provide context for other features.

In certain embodiments, the present invention provides systems and methods for recovering helium from a feed stream comprising helium, carbon dioxide ($CO_2$), and one or more components of intermediate volatility (i.e. having a volatility between those of helium and $CO_2$). Such components are referred to herein as "intermediate components," and may include (but are not limited to) nitrogen, hydrogen, argon, methane, and ethane. The methods comprise separating $CO_2$ and intermediate components from helium at a temperature greater than −82.7° C., or alternatively at a temperature greater than −56.6° C., and forming a helium-rich product stream, wherein the concentration of at least one of the intermediate components in the helium-rich product stream is lower than its concentration in the feed stream. In one or more embodiments of the methods of the present invention, at least part of the separation is effected by contacting a vapor with a liquid. In one or more embodiments, at least part of the method takes place at a temperature below the ambient temperature.

In certain embodiments, the feed stream may comprise at least 50 mol % $CO_2$, or at least 60 mol % $CO_2$, or at least 70 mol % $CO_2$, or at least 75 mol % $CO_2$, or at least 80 mol % $CO_2$, or at least 85 mol % $CO_2$, or at least 90 mol % $CO_2$. Further, the feed streams employed in the present invention generally comprise less than about 3 mol %, or less than about 2 mol %, or less than about 1 mol % helium, and may comprise from 0 to about 15 mol %, or from 1 to about 10 mol %, or from 2 to about 8 mol % nitrogen. The feed stream may be a gas, liquid, or mixed feed, and may optionally comprise a supercritical fluid. In one or more embodiments, a high pressure feed may be employed; for example, the pressure of the feed stream may be greater than about 30 bar, or greater than about 35 bar, or greater than about 40 bar.

In some embodiments, systems and methods of the present invention further comprise the steps of cooling the feed stream, and separating the feed stream in a first separator to form a first helium-enriched stream and a first $CO_2$-enriched stream. The streams may be cooled and separated by any available means known to those skilled in the art and compatible with the overall process and desired results. For example, the streams may be cooled, and other streams in the process heated, in a single heat exchanger that provides thermal control and integration for the process as a whole. Alternately, multiple heat exchangers, one or more refrigeration units or chillers, or other cooling methods may be used. The feed stream may optionally be dried prior to cooling to remove enough water from the feed to avoid formation of ice or $CO_2$ hydrate in the process. For example, the feed stream may be dried to achieve a water dew point less than or equal to −40° C. The feed stream may be dried using any suitable drying process or equipment. For example, the feed stream may be dried via temperature swing adsorption.

Similarly, the streams may be separated by any available means known to those skilled in the art and compatible with the overall process and desired results. Although the term "separator" is predominantly used herein for ease of reference, the term is intended to encompass any suitable separation device or devices. For example, the feed stream may be separated using one or more packed or trayed columns, one or more flash separators, one or more adsorption units, membrane separators, etc. Preferably, the feed stream is separated via a distillation column and the first helium-enriched stream is optionally separated via an adsorption unit such as a pressure swing adsorption system (PSA).

The distillation column may optionally include one or more reboilers, in which a liquid stream is withdrawn from the column, heated and at least partially vaporized, and at least the vapor portion is returned to the column. The one or more reboilers may vaporize liquid withdrawn from the bottom of the column or from an intermediate stage of the column, and may similarly return vapor to the bottom of the column or to an intermediate stage of the column. In one or more embodiments of the invention, the distillation column comprises a bottom reboiler. In further embodiments, the distillation column comprises a bottom reboiler and one or more intermediate reboilers.

In some embodiments of the present invention, the distillation column may incorporate a "$CO_2$ wash," in which the feed stream enters the column at an intermediate stage and a liquid stream comprising $CO_2$ (generally in addition to other components) is fed to the top of the column. In this manner, nitrogen is washed from the helium-enriched overhead stream of the column and moved to the first $CO_2$-enriched stream. The $CO_2$ wash also has the benefit of removing methane and other hydrocarbons from the overhead stream, eliminating impurities that would otherwise have to be removed in a subsequent cryogenic purification process. As a result, the use of a $CO_2$ wash in the distillation column results in a higher overall helium recovery when compared to a column without a $CO_2$ wash stream. For example, the helium-rich product stream generated by the systems and methods of the present invention will generally comprise at least about 60 mol % helium when the distillation column is operated without a $CO_2$ wash. When a $CO_2$ wash is employed in the distillation column, however, the helium-rich product stream may comprise greater than 85 mol % helium, or greater than 90 mol % helium, or greater than 92 mol % helium, or greater than 95 mol % helium.

The $CO_2$ wash may come from a variety of sources. For example, in certain embodiments of the invention, the first $CO_2$-enriched stream exiting the distillation column may be split into two or more derivative $CO_2$-enriched streams. One or more of the derivative $CO_2$-enriched streams may then be separated into a vapor fraction and a liquid fraction, and the liquid fraction obtained as a result may be recycled to the top of the column as a $CO_2$ wash stream. In such methods, the derivative $CO_2$-enriched stream may optionally be heated prior to separation, and the liquid fraction may optionally be cooled before being fed to the top of the distillation column. In other embodiments, the $CO_2$ wash stream may be taken from the feed stream. In such embodiments, the feed stream is partially cooled and separated into a liquid fraction and a vapor fraction. At least a portion of the liquid fraction is directed to the top of the distillation column, while the vapor fraction is further cooled and fed to the distillation column. Optionally, the at least a portion of the liquid fraction may be further cooled prior to entering the top of the distillation column. Persons of skill in the art will recognize that $CO_2$ wash streams may come from a variety of sources within the processes described herein, provided that they comprise a sufficient amount of $CO_2$ to be effective for the intended purpose. $CO_2$ wash streams from any such source are contemplated herein and are within the scope of the present invention.

Some systems and methods of the present invention further comprise the steps of splitting the first $CO_2$-enriched stream into two or more derivative $CO_2$-enriched streams, heating at least one of the derivative $CO_2$-enriched streams (for example via a heat exchanger also used to cool the feed stream), and combining the two or more derivative $CO_2$-enriched streams to form a $CO_2$-rich product stream. One or more of the streams may optionally be compressed before the streams are combined.

Some systems and methods of the present invention further comprise the elimination (or rejection) of at least one of the components of intermediate volatility. Such systems and methods further comprise separating one of the derivative $CO_2$-enriched streams in a second separator into a liquid fraction and a vapor fraction, cooling the vapor fraction, and separating the resulting cooled fraction into (i) a product stream enriched in at least one of the components of intermediate volatility and (ii) a $CO_2$-rich recycle stream. Optionally, the liquid fraction exiting the second separator may be heated and further separated in to a secondary liquid fraction and a secondary vapor fraction, and the secondary liquid fraction may be recycled to the top of the distillation column to provide a $CO_2$ wash. In one or more embodiments, the second separator is a distillation column. In the same or other embodiments, the product stream enriched in at least one of the components of intermediate volatility comprises nitrogen. Preferably, the product stream is nitrogen-rich. In such systems and methods incorporating nitrogen rejection, the $CO_2$-rich recycle stream may be recombined with the first $CO_2$-enriched stream exiting the distillation column (or recombined with one of the derivative $CO_2$-enriched streams formed after the $CO_2$-rich recycle stream is split), thus forming part of the $CO_2$-rich product stream. The $CO_2$-rich product stream in such embodiments may comprise greater than 80 mol % $CO_2$, or greater than 85 mol % $CO_2$, or greater than 90 mol % $CO_2$, or greater than 95 mol % $CO_2$.

In some embodiments, the first helium-enriched stream is separated in a third separator to form the helium-rich product stream and a helium-lean stream. Preferably, the first helium-enriched stream is separated in a PSA. The PSA may be configured to remove, for example, nitrogen, argon, and $CO_2$ from the first helium-enriched stream. The helium-lean stream may then be directed downstream for further processing, removed as a product, or recycled. If recycled, the helium-lean stream may be independently fed to the distillation column, or may alternatively be combined with the feed stream at a point upstream of the distillation column.

In the same or other systems and methods of the invention, the first helium-enriched stream exiting the distillation column may comprise one or more combustible components. In such embodiments, the combustible components of the first helium-enriched stream may be catalytically combusted in the presence of oxygen to at least partially convert the combustible components (such as, for example, hydrogen and/or methane) into $CO_2$ and water. The water may then be removed, either in a separate step or when the first helium-enriched stream is separated to form the helium-rich product stream and the second $CO_2$-enriched stream. By combusting the first helium-enriched stream in this manner and removing at least a portion of the combustion products, a substantially pure helium product stream may be obtained. For example, the helium-rich product stream may comprise at least 98 mol % helium, or at least 99 mol % helium, or at least 99.5 mol % helium, or at least 99.9 mol % helium. In systems and methods incorporating both nitrogen rejection and combustion of the first helium-enriched stream, a $CO_2$ composition in the $CO_2$-rich product stream can be obtained such that the $CO_2$-rich product stream meets downstream pipeline requirements while also achieving a substantially pure helium product. For example, the $CO_2$-rich product stream may comprise greater than 90 mol % $CO_2$, or greater than 92 mol % $CO_2$, or greater than 95 mol % $CO_2$. Alternatively, or in addition to catalytic combustion, hydrogen may be removed by oxidation with an inorganic oxide, such as in beds provided in tandem for switching between on-line and regeneration modes. Suitable inorganic oxides include, but are not limited to, copper (II) oxide (CuO).

In certain embodiments of the invention, it may be unnecessary or undesirable to further separate or purify the first helium-enriched stream downstream of the distillation column. In such embodiments, the PSA described above may be eliminated, while the remainder of the process remains unchanged and may have any of the configurations or a combination of the configurations described herein. For example, configurations that include a $CO_2$ wash stream in the distillation column may be adapted to operate without the PSA, regardless of the source of the $CO_2$ wash stream and regardless of whether the configuration also incorporates nitrogen rejection.

Having described the various aspects of the compositions herein, further specific embodiments of the invention include those set forth in the following lettered paragraphs:

A. A method for recovering helium from a feed stream comprising helium, carbon dioxide, and one or more intermediate components having volatilities between those of carbon dioxide and helium, the method comprising separating the carbon dioxide and the intermediate components from the helium at a temperature greater than −82.7° C. to form a helium-rich product stream, wherein the concentration of at least one of the intermediate components in the helium-rich product stream is lower than its concentration in the feed stream, and wherein at least part of the separation is effected by contacting a vapor with a liquid.

B. The method of paragraph A, wherein the carbon dioxide and the intermediate components are separated from the helium at a temperature greater than −56.6° C.

C. The method of any of paragraphs A through B, wherein the feed stream comprises at least 50 mol % carbon dioxide.

D. The method of any of paragraphs A through C, wherein at least part of the method takes place at a temperature below the ambient temperature.

E. The method of any of paragraphs A through D, further comprising the steps of: (a) cooling the feed stream; (b) separating the feed stream into a first helium-enriched stream and a first $CO_2$-enriched stream; and (c) separating the first helium-enriched stream to form the helium-rich product stream and a helium-lean stream.

F. The method of paragraph E, further comprising the steps of: (d) splitting the first $CO_2$-enriched stream into two or more derivative $CO_2$-enriched streams; (e) heating at least one of the two or more derivative $CO_2$-enriched streams; and (f) compressing and combining the two or more derivative $CO_2$-enriched streams to form a $CO_2$-rich product stream.

G. The method of any of paragraphs E through F, wherein the feed stream is dried to a water dew point of less than or equal to −40° C. prior to cooling the feed stream.

H. The method of any of paragraphs E through G, wherein the feed stream is separated in step b) in a distillation column and wherein the helium-lean stream is recycled and fed to the distillation column.

I. The method of paragraph H, wherein the recycled helium-lean stream is combined with the feed stream before being fed to the distillation column.

J. The method of any of paragraphs E through I, wherein the feed stream is separated in step b) in a distillation column having a first reboiler, wherein a first liquid stream is withdrawn from the bottom of the distillation column, heated and at least partially vaporized, and at least the vapor portion of the heated first liquid stream is returned to the bottom of the distillation column.

K. The method of paragraph J, wherein the distillation column further comprises a second reboiler, wherein a second liquid stream is withdrawn from an intermediate stage of the distillation column, heated and at least partially vaporized, and at least the vapor portion of the heated second liquid stream is returned to an intermediate stage of the distillation column.

L. The method of any of paragraphs J through K, wherein at least part of the feed stream enters the distillation column at an intermediate location, further comprising feeding a liquid stream comprising $CO_2$ to the top of the distillation column.

M. The method of any of paragraphs F through I, wherein the feed stream is separated in step b) in a distillation column and at least part of the feed stream enters the distillation column at an intermediate location, further comprising separating at least one of the two or more derivative $CO_2$-enriched streams into a liquid fraction and a vapor fraction and feeding the liquid fraction to the top of the distillation column.

N. The method of paragraph M, wherein the derivative $CO_2$-enriched stream is heated prior to separating the stream into the liquid fraction and the vapor fraction and wherein the liquid fraction is cooled prior to entering the top of the distillation column.

O. The method of paragraph L or M, wherein the helium-rich product stream comprises at least 90 mol % helium.

P. The method of any of paragraphs F through O, further comprising separating one of the derivative $CO_2$-enriched streams into a liquid fraction and a vapor fraction, cooling the vapor fraction of the derivative $CO_2$-enriched stream, and separating the resulting cooled fraction into a product stream enriched in at least one of the components of intermediate volatility and a $CO_2$-rich recycle stream.

Q. The method of any of paragraphs F through O, further comprising separating one of the derivative $CO_2$-enriched streams into a liquid fraction and a vapor fraction, cooling the vapor fraction, and separating the resulting cooled fraction into a nitrogen-rich product stream and a $CO_2$-rich recycle stream.

R. The method of any of paragraphs E through Q, wherein the first helium-enriched stream comprises one or more combustible components, further comprising catalytically combusting the combustible components of the first helium-enriched stream in the presence of oxygen to at least partially convert the combustible components to $CO_2$ and water and removing the water prior to or in the same step as separating the first helium-enriched stream to form the helium-rich product stream and the second $CO_2$-enriched stream.

S. The method of paragraph R, wherein the helium-rich product stream comprises at least 99 mol % helium.

T. The method of any of paragraphs A through R, wherein the helium-rich product stream comprises at least 60 mol % helium.

U. The method of any of paragraphs F through T, wherein the $CO_2$-rich product stream comprises at least 90 mol % $CO_2$.

V. The method of any of paragraphs F through U, wherein the $CO_2$-rich product stream comprises at least 95 mol % $CO_2$.

W. The method of any of paragraphs A through V, wherein the feed stream comprises a gas.

X. The method of any of paragraphs A through W, wherein the feed stream comprises a liquid.

Y. The method of any of paragraphs A through X, wherein the feed stream comprises a supercritical fluid.

Z. The method of any of paragraphs A through Y, wherein the pressure of the feed stream is greater than about 35 bar.

AA. A system for recovering helium from a feed stream, the system comprising: (a) a feed stream comprising helium and at least 50 mol % $CO_2$; (b) a first separator comprising a distillation column configured to separate the feed stream into a first helium-enriched stream and a first $CO_2$-enriched stream, wherein at least part of the feed stream enters the distillation column at an intermediate location; (c) one or more heat exchangers configured to cool the feed stream and heat the first helium-enriched and first $CO_2$-enriched streams; (d) a second separator configured to separate (i) the feed stream and/or (ii) a portion of the first $CO_2$-enriched stream into a liquid fraction and a vapor fraction and recycle the liquid fraction to the top of the distillation column; and (e)

a compressor configured to compress the non-separated portion of the first $CO_2$-enriched stream and the vapor fraction of any separated portion of the first $CO_2$-enriched stream to form a $CO_2$-rich product stream.

BB. The system of paragraph AA, further comprising a third separator configured to separate the first helium-enriched stream to form a helium-rich product stream and a helium-lean stream.

CC. The system of any of paragraphs AA through BB, further comprising a drier configured to dry the feed stream to a water dew point of less than or equal to −40° C. before the feed stream is cooled in the heat exchanger.

DD. The system of any of paragraphs BB through CC, wherein the helium-lean stream is recycled and fed to the distillation column.

EE. The system of any of paragraphs AA through DD, wherein the first separator further comprises a first reboiler configured to supply vapor to the bottom of the distillation column.

FF. The system of paragraph EE, wherein the first separator further comprises a second reboiler configured to supply vapor to an intermediate stage of the distillation column.

GG. The system of any of paragraphs AA through FF, wherein the feed stream or the portion of the first $CO_2$-enriched stream is heated prior to entering the second separator and the liquid fraction is cooled prior to entering the top of the distillation column.

HH. The system of any of paragraphs BB through GG, wherein the helium-rich product stream comprises at least 90 mol % helium.

II. The system of any of paragraphs BB through HH, wherein the third separator comprises a pressure swing adsorption unit (PSA).

JJ. The system of paragraph II, wherein the PSA is configured to remove at least nitrogen, argon, and $CO_2$ from the first helium-enriched stream.

KK. The system of any of paragraphs AA through JJ, further comprising a fourth separator, wherein the vapor fraction exiting the second separator is cooled and wherein the fourth separator is configured to separate the resulting cooled fraction into a $CO_2$-rich recycle stream and a product stream rich in one or more intermediate components having a volatility between those of $CO_2$ and helium.

LL. The system of paragraph KK, wherein in step d) the liquid fraction exiting the second separator is heated and separated into a secondary liquid fraction and a secondary vapor fraction and the secondary liquid fraction is recycled to the top of the distillation column.

MM. The system of any of paragraphs AA through LL, wherein the second separator is a distillation column.

NN. The system of any of paragraphs KK through MM, wherein the fourth separator is a distillation column.

OO. The system of any of paragraphs BB through NN, wherein the first helium-enriched stream comprises one or more combustible components, further comprising a catalytic combustor configured to combust the first helium-enriched stream in the presence of oxygen to at least partially convert the combustible components to $CO_2$ and water and optionally remove at least part of the water before the first helium-enriched stream enters the second separator.

PP. The system of paragraph OO, wherein the helium-rich product stream comprises at least 99 mol % helium.

QQ. The system of any of paragraphs AA through OO, wherein the helium-rich product stream comprises at least 60 mol % helium.

RR. The system of any of paragraphs BB through QQ, wherein the $CO_2$-rich product stream comprises at least 90 mol % $CO_2$.

SS. The system of any of paragraphs BB through RR, wherein the $CO_2$-rich product stream comprises at least 95 mol % $CO_2$.

TT. The system of any of paragraphs AA through SS, wherein the feed stream comprises a gas.

UU. The system of any of paragraphs AA through TT, wherein the feed stream comprises a liquid.

VV. The system of any of paragraphs AA through UU, wherein the feed stream comprises a supercritical fluid.

WW. The system of any of paragraphs AA through VV, wherein the pressure of the feed stream is greater than about 35 bar.

DETAILED DESCRIPTION OF THE DRAWINGS AND EXAMPLES

The systems and methods of the invention may be further understood with reference to FIGS. 1 through 7 and the descriptions thereof that follow. It should be noted that the figures are simplified flow diagrams and, in some instances, do not show various pieces of auxiliary equipment, such as pumps, compressors, heat exchangers, and valves. Because one having ordinary skill in the art would recognize easily the need for and location of such auxiliary equipment, its omission is appropriate and facilitates the simplification of the figures. Fluid streams and equipment common to more than one figure or embodiment are identified by the same reference numerals in each figure. In the interest of clarity, some of these shared features that are described with respect to the figure in which they first appear are numbered in subsequent figures but those descriptions are not repeated in the specification.

In the examples that accompany the discussion of the figures, two feed gas compositions are used, referred to as a Low $N_2$ Feed and a High $N_2$ Feed. These compositions are shown in Table 1 on a dry basis, i.e. excluding any water that may be present. The compositions are given on a molar basis in Table 1 and throughout the discussion that follows. These two compositions were chosen to exemplify the invention because they are considered to be typical of a helium-containing $CO_2$ field with low and high levels of nitrogen. Those skilled in the art, however, will recognize that the systems and methods of the present invention are designed to recover helium from feed streams having a wide variety of compositions, and all such possible feed compositions are contemplated herein.

TABLE 1

| Component | Low $N_2$ Feed | High $N_2$ Feed |
|---|---|---|
| $CO_2$, mol % | 96.38 | 92.38 |
| $N_2$, mol % | 3.00 | 7.00 |
| He, mol % | 0.35 | 0.35 |
| $CH_4$, mol % | 0.20 | 0.20 |
| $H_2$, ppm | 100 | 100 |
| Ar, ppm | 600 | 600 |
| $C_2H_6$, ppm | 1 | 1 |
| $H_2S$, ppm | 5 | 5 |

The High $N_2$ Feed composition shown in Table 1 is particularly significant, in that the $CO_2$ content is less than a typical pipeline requirement of 95%. The present invention provides the ability recover helium from the feed while simultaneously increasing the $CO_2$ concentration to the 95% level required by the pipeline. In the case of both the Low $N_2$ Feed and the High $N_2$ Feed, the amount of helium in the feed stream was maintained at a constant value of 30.72 kmol/hr to ensure a consistent basis for comparison. The feed $CO_2$ is at a pressure of 705 psi (48.6 bar), and all of the exemplary processes described below compress the product $CO_2$ to the same pressure as the feed.

All of the processes described herein were modeled using the commercially available software package Aspen Plus V7.2 produced by Aspen Technology, Inc. This program was used to model the physical processes, and its optimizer was used to determine the optimum operating parameters, including pressures and flow rates.

FIG. 1 shows an exemplary system for recovering helium from a $CO_2$-containing feed. FIG. 1 and its accompanying description are included to provide necessary background information for subsequent Figures depicting embodiments of the invention and to establish the state of the art. The feed stream S100 has the composition shown in Table 1. A process in which the feed stream S100 has the Low $N_2$ Feed composition will be considered first. In this low $N_2$ example, stream S100 is at 705 psi (48.6 bar) and is dried in a drier A101 (such as a temperature swing adsorption (TSA) unit, pressure swing adsorption (PSA) unit, or glycol drier) to remove water via stream S101, leaving stream S102 essentially water-free. In practice, there will be some water left in stream S102, for example up to about 50 ppm, but sufficient water is removed in drier A101 to prevent problems that would be caused by water freezing or forming solid $CO_2$ hydrates in the subsequent low temperature process. The drier A101 will therefore dry the feed stream S100 to below a water dew point of approximately −40° C.

The dried stream S102 is then mixed with compressed recycled gas in stream S123 to form stream S103 and cooled to −49° C. in heat exchanger HX100 to yield stream S104, which causes most of the $CO_2$ in the dried feed stream S102 to condense. The condensed $CO_2$-rich liquid phase of stream S104, which is 97.2% of the total flow, is then separated from the vapor phase of S104 in phase separator C100, resulting in a first $CO_2$-enriched liquid stream S105 and a helium-enriched vapor stream S106. Stream S106 comprises 2.8% of the stream fed to HX100 through stream S103. This vapor stream has been enriched in helium due to the condensing of the predominant $CO_2$ component from the gas phase and has a concentration of 13.3% helium.

The helium-enriched stream S106 is then re-heated in HX100 and passed to a PSA unit A100. The warmed, helium-enriched stream S107 still contains some $CO_2$, in this case 21.1% $CO_2$, and the PSA A100 is used to remove the residual $CO_2$ as the $CO_2$ is an impurity that could freeze and block equipment during subsequent low temperature purification of the crude helium. The PSA A100 will prevent substantially all of the $CO_2$ in stream S107 from reaching the crude helium-rich product stream S108 by rejecting the $CO_2$ into helium-lean stream S109. The crude helium-rich product stream S108 is purified by the PSA process in A100 to produce a composition of 54.7% nitrogen, 42.8% helium, 0.6% methane, 1.1% hydrogen, and 0.85% argon, with less than 1 ppm $C_2H_6$ and $H_2S$, and up to about 1 ppm $CO_2$. The rest of stream S107 fed to the PSA A100 is recovered to the process in helium-lean stream S109. Stream S109 has the composition of the stream that is recovered from the adsorbent in the PSA A100 when it is regenerated by reducing the pressure of the bed, releasing the components that make up stream S109. Helium-lean stream S109 is therefore at low pressure (1.6 bar) and must be recompressed in one or more compressors K101 and K102 to recover the stream to the feed. It is important that this stream is recovered to the process, as it contains 15% of the helium that was fed to PSA A100. Additionally, the $CO_2$ in this stream S109 is also recovered.

There is still significant helium in the $CO_2$-enriched liquid stream S105 exiting the first separator C100. In fact, about 21% of the helium in stream S104 leaves C100 in the liquid stream S105. In order to maximize the recovery of helium from the feed stream S100, this helium can be stripped from the liquid by reducing the pressure and recovering the vapor, which is then recompressed and recycled to the feed. In FIG. 1, this is shown by stream S105 returning to heat exchanger HX100, where it is warmed to −45° C. This heating forms a significant part of the cooling required for HX100 to condense the liquid phase separated in C100.

The warmed $CO_2$-enriched stream S111 is then reduced in pressure to about 25 bar through valve V100 to form stream S112. Only about 2% of the helium fed in feed stream 3100 remains in liquid $CO_2$ stream S115, which results from separation of stream S112 in phase separator C101. This exemplary process was optimized to give 98% helium recovery; reducing the pressure further through V100 would allow for increased helium recovery; however such higher helium recovery would be at the expense of higher recompression power. The vapor stream S113 exiting phase separator C101 contains the recovered helium and is warmed in HX100 to give warmed stream S114, which is then recompressed in compressor K102 to the feed pressure and mixed with the dried feed stream S102 to produce stream S103.

The refrigeration required to condense the feed stream S100 is provided partly by the warming of stream S105, but most of the refrigeration comes from reheating helium-lean liquid $CO_2$ stream S115, which exits phase separator C101. Stream S115 is split into a number of derivative streams. (Two derivative streams S116 and S117 are shown in FIG. 1, but stream S115 may be split into any number of derivative streams to suit the requirements of a particular process.) The derivative streams S116 and S117 are warmed in HX100. These derivative streams may be adjusted in pressure via a valve (such as V101) or a pump (such as P100) to provide refrigeration at different pressure, and therefore temperature, levels. The split between these streams and the pressure to which they are reduced, or pumped, may be easily determined by those skilled in the art so as to optimize the process.

In the system depicted in FIG. 1, some of liquid stream S115 is split into stream S116 and dropped in pressure through valve V101 to about 7.8 bar, so that it boils at a cold enough temperature to provide sufficient temperature difference at the cold end of the heat exchanger. The resulting stream S118 exiting valve V101 is the coldest part of the process, and the optimization used herein has constrained the temperature of stream S118 to be greater than the freezing point of $CO_2$ (and so is at an imposed lower limit of −56° C.). This stream S118 is only a small amount of stream S115, about 5.8%, and serves to open the heat exchanger cooling curve at the cold end. The rest of stream S115, split into stream S117, is pressurized to about 36 bar with pump P100 to result in stream S119, as the pressure required for the stream to boil at the optimal conditions is higher than the pressure required in C101 to drive off the rest of the helium. This pressure was determined by the desired recovery of helium in the process. Part of stream S115 may also be split into an additional stream (not shown) at a third pressure to further optimize the performance of heat exchanger HX100, thereby reducing the subsequent power for recompression, but this was not required in this example. Much of the refrigeration in this process also comes from the re-warming of the $CO_2$-enriched liquid stream S105.

Compressors are used in the process shown in FIG. 1, first to recompress the recycled streams S114 and S109, second to compress the low pressure warmed $CO_2$ stream S120 (which results from warming stream S118 in heat exchanger HX100) to the pressure of the $CO_2$ after pump P100, and finally for compression to the product pressure (these two stages of compression are shown as one compressor K100 with an intermediate feed stream S121, which results from warming stream S119 in heat exchanger HX100, in FIG. 1).

The products from the process are the $CO_2$-rich product stream S122, which contains substantially all of the $CO_2$ from feed stream S100, and a crude helium-rich product stream S108 that can be further purified and liquefied to produce a pure helium stream. The performance of the double flash cycle process depicted in FIG. 1 is summarized in Table 2.

The double flash cycle of FIG. 1 with the High $N_2$ Feed composition given in Table 1 is now considered. The performance of this example is also shown in Table 2. The main differences with this higher nitrogen feed are as follows. Because more helium is recovered in the first separator C100, the pressure of the second separator C101 does not need to be so low, i.e. about 40 bar compared with about 25 bar. The higher pressure $CO_2$ stream S109 used for refrigeration is still around the same pressure (about 36 bar compared to about 33 bar), so in this case P100 would be replaced with a pressure reduction valve. The higher amount of nitrogen in the feed leads to a lower first enriched helium composition in stream S106 exiting separator C100, of 3.55% compared with 13.27%. This also leads to a product crude helium stream S108 of lower helium composition, 14.76% vs. 42.77%, since the performance of the PSA A100, i.e. the recovery of components to the product stream, is assumed to be constant. Further, the extra nitrogen carried through to the PSA A100 means that the PSA A100 will be larger. Finally, the most significant difference between the low $N_2$ feed and the high $N_2$ feed scenarios is the increase in power consumption, particularly the recompression power, which is mostly the extra power required to recompress the increased $CO_2$ and nitrogen rejected in stream S109 from the PSA A100, due to the increased amounts of these components in the vapor from stream S106.

As shown in Table 2, the $CO_2$ product composition (stream S122) has increased in both the low and high nitrogen cases, due to the components that leave in the crude helium product (stream S108). The $CO_2$ product purity in the high nitrogen case is still below the desired 95% $CO_2$ purity specification, so a method is required to increase the $CO_2$ composition to meet this specification. In this case, the purity could be met by reducing the pressure of C101, but this would also increase recycle power compressor further, and reduce the first enriched helium composition (stream S106) and product helium composition (stream S113) as more nitrogen is rejected with the helium product. Further note that in both cases $CO_2$ recovery is 100%, since $CO_2$ is rejected from the crude helium product stream and returned to the process, and helium recovery is 98%, which was the constraint applied to the optimization process.

TABLE 2

| FIG. No. | Feed composition (mol %) | | | | | | S106 composition (mol %) | | | | | | S108 composition (mol %) | | | | | |
|---|---|---|---|---|---|---|---|---|---|---|---|---|---|---|---|---|---|---|
| | He | $H_2$ | $N_2$ | $C_1$ | Ar | $CO_2$ | He | $H_2$ | $N_2$ | $C_1$ | Ar | $CO_2$ | He | $H_2$ | $N_2$ | $C_1$ | Ar | $CO_2$ |
| 1 (low $N_2$ feed) | 0.35 | 0.01 | 3.00 | 0.20 | 0.06 | 96.38 | 13.27 | 0.35 | 62.69 | 1.61 | 0.98 | 21.11 | 42.77 | 1.11 | 54.66 | 0.61 | 0.85 | 0.00 |
| 1 (high $N_2$ feed) | 0.35 | 0.01 | 7.00 | 0.20 | 0.06 | 92.38 | 3.55 | 0.09 | 74.37 | 1.17 | 0.54 | 20.28 | 14.76 | 0.39 | 83.67 | 0.57 | 0.61 | 0.00 |
| 1 ($N_2$ PSA) | 0.35 | 0.01 | 3.00 | 0.20 | 0.06 | 96.38 | 11.20 | 0.29 | 66.53 | 1.31 | 1.00 | 19.67 | 97.46 | 2.54 | 0.00 | 0.00 | 0.00 | 0.00 |
| 2 (low $N_2$ feed, no intermediate reboiler) | 0.35 | 0.01 | 3.00 | 0.20 | 0.06 | 96.38 | 31.44 | 0.53 | 47.06 | 1.40 | 0.76 | 18.82 | 69.76 | 1.17 | 28.25 | 0.37 | 0.45 | 0.00 |
| 2 (low $N_2$ feed, intermediate reboiler) | 0.35 | 0.01 | 3.00 | 0.20 | 0.06 | 96.38 | 31.63 | 0.54 | 46.93 | 1.39 | 0.76 | 18.75 | 69.92 | 1.20 | 28.07 | 0.36 | 0.45 | 0.00 |
| 2 (high $N_2$ feed, no intermediate reboiler) | 0.35 | 0.01 | 7.00 | 0.20 | 0.06 | 92.38 | 5.09 | 0.13 | 74.32 | 1.15 | 0.53 | 18.79 | 19.86 | 0.49 | 78.55 | 0.53 | 0.57 | 0.00 |
| 2 (high $N_2$ feed, intermediate reboiler) | 0.35 | 0.01 | 7.00 | 0.20 | 0.06 | 92.38 | 5.17 | 0.13 | 74.24 | 1.14 | 0.53 | 18.78 | 20.16 | 0.50 | 78.26 | 0.52 | 0.56 | 0.00 |
| 2 (low $N_2$ feed, no intermediate reboiler, $N_2$ PSA) | 0.35 | 0.01 | 3.00 | 0.20 | 0.06 | 96.38 | 29.03 | 0.50 | 49.43 | 1.21 | 0.79 | 19.03 | 98.30 | 1.70 | 0.00 | 0.00 | 0.00 | 0.00 |
| 3 (low $N_2$ feed, no intermediate reboiler) | 0.35 | 0.01 | 3.00 | 0.20 | 0.06 | 96.38 | 62.94 | 1.16 | 15.38 | 0.31 | 0.19 | 20.01 | 92.08 | 1.70 | 6.09 | 0.05 | 0.07 | 0.00 |
| 3 (high $N_2$ feed, no intermediate reboiler) | 0.35 | 0.01 | 7.00 | 0.20 | 0.06 | 92.38 | 58.67 | 1.05 | 19.95 | 0.30 | 0.13 | 19.90 | 90.00 | 1.61 | 8.28 | 0.05 | 0.05 | 0.00 |
| 3 (low $N_2$ feed, intermediate reboiler) | 0.35 | 0.01 | 3.00 | 0.20 | 0.06 | 96.38 | 62.62 | 1.08 | 15.80 | 0.31 | 0.19 | 20.00 | 92.00 | 1.59 | 6.28 | 0.05 | 0.08 | 0.00 |
| 4 | 0.35 | 0.01 | 7.00 | 0.20 | 0.06 | 92.38 | 63.93 | 1.18 | 14.56 | 0.23 | 0.09 | 20.01 | 92.52 | 1.70 | 5.70 | 0.04 | 0.04 | 0.00 |
| 5 | 0.35 | 0.01 | 7.00 | 0.20 | 0.06 | 92.37 | 64.43 | 0.89 | 14.36 | 0.23 | 0.09 | 20.00 | 100.00 | 0.00 | 0.00 | 0.00 | 0.00 | 0.00 |

| FIG. No. | $CO_2$ recompression Power (MW) | Recycle compression Power (MW) | Total Power (MW) | $CO_2$ Recovery | He Recovery |
|---|---|---|---|---|---|
| 1 (low $N_2$ feed) | 2.67 | 0.94 | 3.61 | 100.0% | 98.0% |
| 1 (high $N_2$ feed) | 3.19 | 2.74 | 5.93 | 100.0% | 98.0% |
| 1 ($N_2$ PSA) | 2.85 | 1.41 | 4.27 | 100.0% | 98.0% |
| 2 (low $N_2$ feed, no intermediate reboiler) | 2.22 | 0.24 | 2.47 | 100.0% | 99.1% |
| 2 (low $N_2$ feed, intermediate reboiler) | 1.73 | 0.24 | 1.98 | 100.0% | 99.1% |
| 2 (high $N_2$ feed, no intermediate reboiler) | 2.60 | 1.92 | 4.52 | 100.0% | 99.7% |
| 2 (high $N_2$ feed, intermediate reboiler) | 2.57 | 1.88 | 4.44 | 100.0% | 99.2% |
| 2 (low $N_2$ feed, no intermediate reboiler, $N_2$ PSA) | 2.16 | 0.41 | 2.57 | 100.0% | 99.1% |
| 3 (low $N_2$ feed, no intermediate reboiler) | 2.16 | 0.08 | 2.25 | 100.0% | 99.9% |
| 3 (high $N_2$ feed, no intermediate reboiler) | 2.27 | 0.10 | 2.37 | 100.0% | 99.9% |
| 3 (low $N_2$ feed, intermediate reboiler) | 1.98 | 0.08 | 2.07 | 100.0% | 99.9% |
| 4 | 2.88 | 0.08 | 2.96 | 99.1% | 99.8% |
| 5 | 3.00 | 0.14 | 3.14 | 99.1% | 99.8% |

Figure 2:
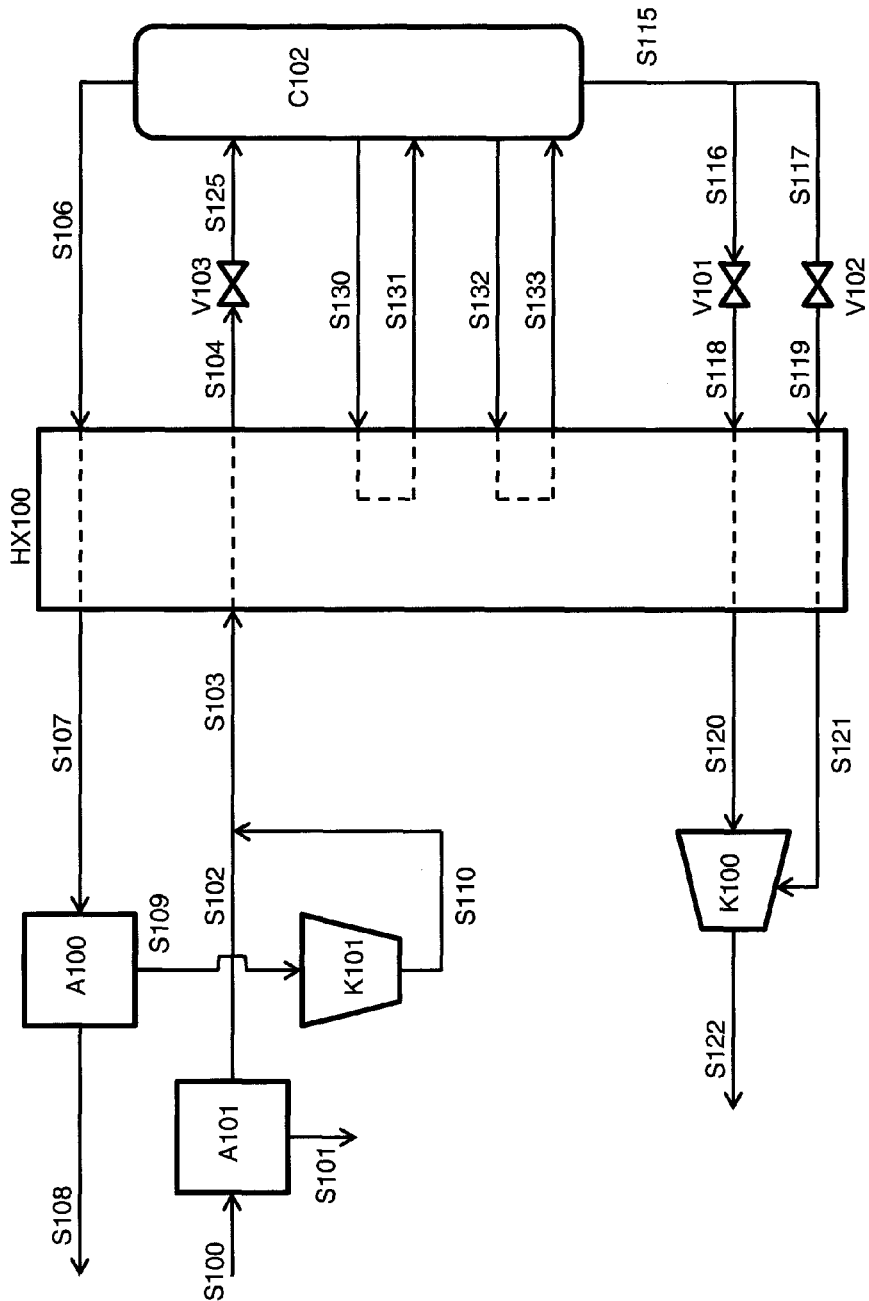
FIG. 2 is a schematic diagram of a helium recovery system incorporating a stripping column.

The process exemplified in FIG. 2 improves upon the cycle of FIG. 1. Like FIG. 1, FIG. 2 and its accompanying description are included to provide necessary background information for subsequent Figures depicting embodiments of the invention and to establish the state of the art. The process depicted in FIG. 2 includes a stripping column C102 in place of the two separators C100 and C101 used in the system of FIG. 1, allowing a significant reduction in power. The reduction in power is because less power is required to recompress the $CO_2$ back to pipeline pressure, since its pressure is maintained high. Part of the refrigeration that was carried out by evaporating $CO_2$ in FIG. 1 is now carried out by integrating the heat required for the main reboiler (streams S132 and S133) into the heat exchanger HX100. Further efficiency improvements are achieved by adding an optional intermediate reboiler (streams S130 and S131) to the column. Since the intermediate reboiler is further up the column, it provides a colder stream that can be integrated into heat exchanger HX100 to provide refrigeration at a lower temperature than that provided by the main column reboiler. Both low $N_2$ and high $N_2$ feed compositions, as well as embodiments with and without an intermediate reboiler, were considered as exemplified in FIG. 2.

In FIG. 2, the features that are the same as in FIG. 1 have been labeled with the same reference numerals. The feed stream S100 has the composition shown in Table 1. An example in which the feed stream S100 has a low $N_2$ feed composition will be considered first. The feed stream S100 is dried in TSA A101 and combined with the compressed offgas S110 from the PSA A100. The combined stream S103 is then cooled in exchanger HX100 to give stream S104 at about −54° C., at which point the stream has mostly been liquefied (the liquid fraction is around 99.5%). Stream S104 is then dropped in pressure via valve V103 to reach the operating pressure of stripping column C102, which in this case is about 40 bar, to give stream S125, which is then fed to the top stage of stripping column C102. C102 is a packed or trayed distillation column designed to allow vapor/liquid contacting, as is well known in the art. In this case, C102 has been modeled with 10 theoretical stages, although more or fewer could easily be used to effect the separation.

A stripping column is a type of distillation column in which there is a reboiler but no overhead condenser, with the reflux liquid being supplied only by the liquid provided by the feed stream. In this case, stripping column C102 comprises not only a main reboiler but also an optional intermediate reboiler. Both of these reboilers are provided with the heat they require by integration into heat exchanger HX100. The main (or bottom) reboiler is integrated by taking the stream leaving the bottom stage of the column, S132, and passing this to HX100 where it is heated and partially vaporized, to provide the upward flowing vapor for the bottom part of column C102 in stream S133. In this case stream S132 is at −23° C. and stream S133 is at −13° C. This provides refrigeration for the mid-part of the cooling curve of HX100. The intermediate reboiler functions by taking a liquid stream S130 leaving, in this case, the middle of the column (i.e. leaving the 5th theoretical stage of the column C102 as it is modeled within Aspen Plus) and passing this to HX100 where it is heated and partially vaporized to provide upward flowing vapor for the top part of the column C102 in stream S131. In this case stream S130 is at −52° C. and stream S133 is at −26° C. This provides refrigeration for the lower part of the cooling curve of HX100.

Around a third of the refrigeration required to condense the feed stream S100 is provided by the reboiler or reboilers within C102, but most of the refrigeration comes from reheating the helium-lean liquid $CO_2$ stream S115 exiting the bottom of C102. Stream S115 is split into a number of streams, which are warmed in HX100. The streams into which stream S115 are divided provide refrigeration at different pressure, and therefore temperature, levels as previously described with respect to FIG. 1. The split between these streams and the pressure to which they are reduced or pumped is determined so as to optimize the process.

In this case some of stream S116 is dropped in pressure through valve V101 to about 6.0 bar so that it boils at a cold enough temperature to provide a sufficient temperature difference at the cold end of heat exchanger HX100. This stream S118 after valve V101 is the coldest part of the process. The optimization has constrained the temperature of S118 to be greater than the freezing point of $CO_2$, and is therefore at an imposed lower limit of −56° C. This stream is only a small amount of the total flow of stream S115, about 5%, to open the heat exchanger cooling curve at the cold end. The rest, stream S117, is maintained at the column pressure of 40 bar, as the pressure required for the stream to boil at the optimal conditions was determined by the optimizer to be the same as the column pressure. In scenarios employing a high $N_2$ feed, however, V102 is used to reduce the pressure of stream S117 to a lower pressure, corresponding to a lower temperature. Part of the stream may also be at a third pressure (not shown) to further optimize the performance of the heat exchanger, thereby reducing the subsequent power for recompression, but that was not required in this case.

Compressors K101 and K100 are used, first to recompress the recycled stream S109, second to compress the low pressure warmed $CO_2$ stream S120 to the pressure of the higher pressure stream S121, and then finally for compression to the product pressure (these two stages of compression are shown as one machine K100 with an intermediate feed stream in FIG. 2).

The products from the process are the $CO_2$ product stream S122, which contains substantially all of the $CO_2$ from feed S100, and a crude helium product stream S108 that can be further purified and liquefied to produce a pure helium stream. The performance of this stripping column cycle is summarized in Table 2.

Table 2 shows that the stripping column cycle depicted in FIG. 2 is an improvement over the double flash cycle of FIG. 1, although this comes with the added complexity of a distillation column and reboilers integrated into the main exchanger HX100. It is apparent that, particularly with low $N_2$ feed, there is a significant reduction in power consumption and a higher concentration of helium in streams S106 and S108, indicating a benefit that will be realized by a smaller PSA (A100) and reduction in the cost of purifying the crude helium. Note, however, that with a high $N_2$ feed there is a deterioration in the performance of the stripping column cycle, as the increased nitrogen in the feed affects this process in much the same way that it affects the double flash cycle due to an increase in the nitrogen in streams S106 and S108.

The optimum pressure for column C102 as depicted in FIG. 2, with both high and low $N_2$ feeds and both with and without an intermediate reboiler, is determined by process optimization and the results are shown in Table 3. As shown in Table 3, with low nitrogen in the feed the pressure is reduced across V103 to give an operating pressure in the column C102 of just over 40 bar for the two cases shown (with and without an intermediate reboiler). However, with high nitrogen in the feed the column pressure is maintained high but pressure is dropped across V102 to achieve the optimum pressure for the higher pressure $CO_2$ refrigeration stream. Table 3 also shows that the intermediate reboiler gives a significant benefit over a single reboiler when there is low nitrogen in the feed, where there is a benefit of 0.49 MW, but gives only a 0.08 MW benefit when there is a high level of nitrogen in the feed.

TABLE 3

|  | Low $N_2$ Feed, Intermediate reboiler | High $N_2$ Feed, Intermediate reboiler | Low $N_2$ Feed, No intermediate reboiler | High $N_2$ Feed, No intermediate reboiler |
|---|---|---|---|---|
| C102 pressure (bar) | 40.48 | 47.00 | 40.30 | 47.00 |
| Intermediate reboiler duty (MW) | 5.89 | 0.40 | 0.00 | 0.00 |
| Main reboiler duty (MW) | 2.99 | 4.50 | 8.81 | 5.06 |
| S116 flow as a fraction of S115 | 0.05 | 0.06 | 0.08 | 0.06 |
| S118 pressure (bar) | 6.00 | 6.85 | 6.22 | 6.37 |
| S119 pressure (bar) | 40.48 | 35.88 | 40.30 | 35.75 |
| K101 power (MW) | 0.24 | 1.88 | 0.24 | 1.92 |
| K100 power (MW) | 1.73 | 2.57 | 2.22 | 2.60 |
| $CO_2$ recovery (%) | 100.0 | 100.0 | 100.0 | 100.0 |
| He recovery (%) | 99.1 | 99.2 | 99.1 | 99.7 |
| S108 helium purity (mol %) | 69.92 | 20.16 | 69.76 | 19.86 |

The examples of FIG. 2, as reported in Table 3, show that a cycle is required that can handle the Low and High $N_2$ Feed streams equally well. The double flash and the stripping columns of FIGS. 1 and 2 do well with the Low $N_2$ Feed composition, but their performance, as measured in power consumption and the helium composition of the helium product stream S108, needs to be improved. Also, with the High $N_2$ Feed, there is a need to enrich the $CO_2$ product composition to meet a pipeline requirement of >95% $CO_2$. These issues are addressed in the following inventive embodiments of FIGS. 3 through 7.

Figure 3:
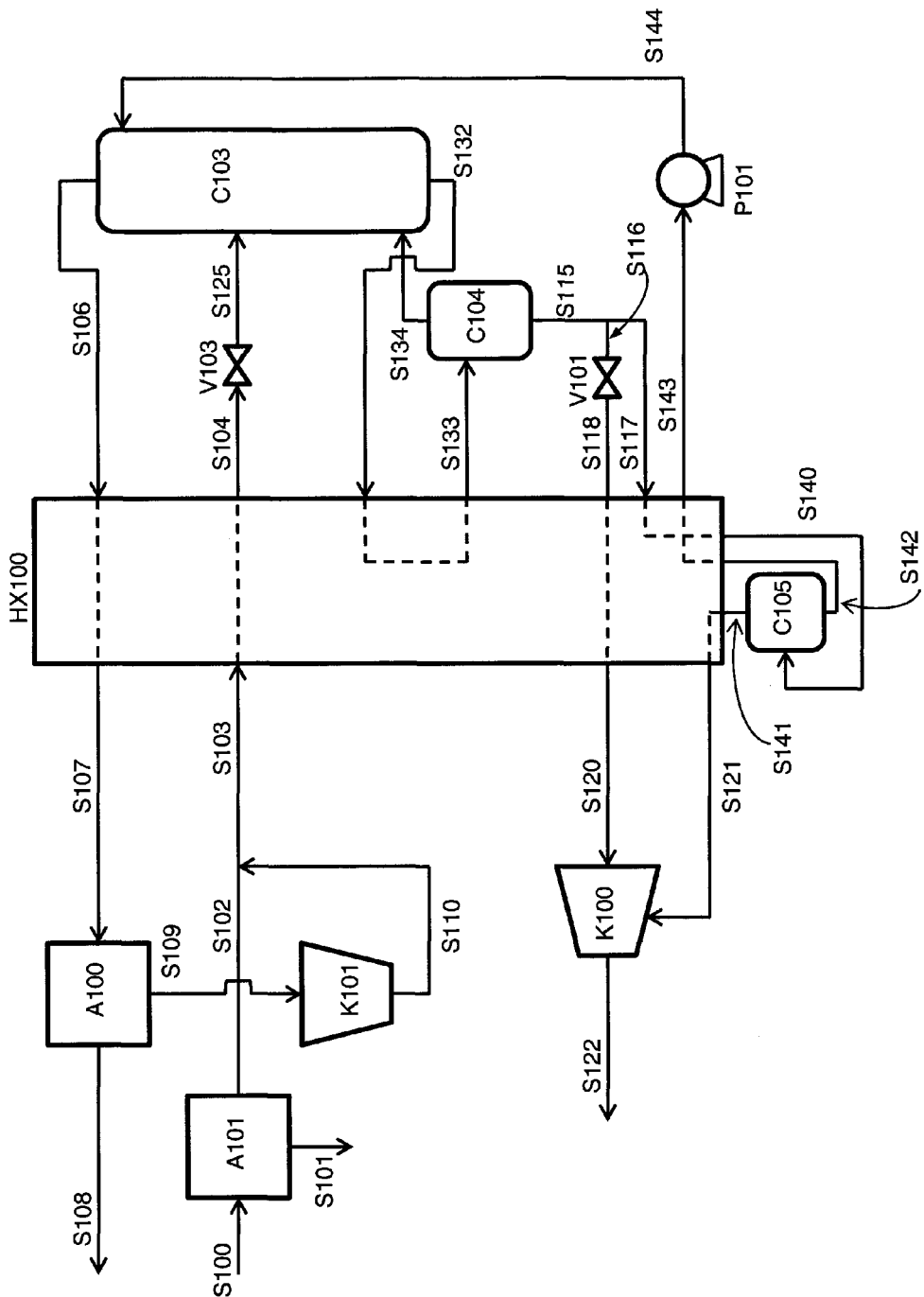
FIG. 3 is a schematic diagram of an embodiment of the invention incorporating a distillation column with a $CO_2$ wash stream.

FIG. 3 shows a process that incorporates a $CO_2$ wash in the main separation column. This embodiment differs from the stripping column cycle of FIG. 2 in that the distillation column C103 has a section above the main feed where the overhead vapor is washed with a stream comprising liquid $CO_2$ in order to further reduce the amount of nitrogen in the first helium-enriched stream S106.

In FIG. 3, the features that are the same as in FIG. 1 or FIG. 2 have been labeled with the same reference numerals. The feed stream S100 has the composition shown in Table 1. An embodiment in which the feed stream S100 has a low $N_2$ feed composition will be considered first. The feed stream is dried in TSA A101 and combined with the compressed offgas from the PSA A100 in stream S110. The combined stream S103 is cooled in heat exchanger HX100 to give stream S104 at −17° C., at which point the stream has mostly been liquefied (the liquid fraction is around 99.1%). Stream S104 is then dropped in pressure via valve V103 to reach the operating pressure of the column C103, which in this case is 41 bar, to give stream S125. Stream S125 is then fed to the stage within column C103 determined to be the optimum location; in this case the stream enters onto the 6th theoretical stage from the top of the column C103. C103 is a packed or trayed distillation column designed to allow vapor/liquid contacting, as is well known in the art. In this case, column C103 has been modeled with 15 theoretical stages, although more or fewer could easily be used to effect this separation.

As with the stripping column in FIG. 2, the distillation column C103 has been modeled with and without an intermediate reboiler. Shown in FIG. 3 is the case without an intermediate reboiler. The main reboiler is as discussed in the description of the stripping column embodied in FIG. 2, however in FIG. 3 more detail has been given regarding the flow arrangement in the main reboiler. The liquid stream taken from the bottom stage of C103, stream S132, is at −18° C. and is heated and partially vaporized in HX100 to −8° C. The two-phase stream from HX100, stream S133, is separated in phase separator C104 into a liquid fraction, stream S115, and a vapor fraction, stream S134, that is returned to column C103 to provide the upward-flowing vapor stream required by the distillation process.

Some of the refrigeration required to condense the feed stream is provided by the reboiler or reboilers within C103, but most of the refrigeration comes from reheating the helium-lean liquid stream S115 exiting phase separator C104. Stream S115 is split into a number of streams that are warmed in HX100. The streams into which stream S115 are divided provide refrigeration at different pressure, and therefore temperature, levels. The split between these streams and the pressure to which they are reduced or pumped is determined so as to optimize the process.

In this case some of this liquid, in stream S116, is dropped in pressure through valve V101 to 7.3 bar so that it boils at a cold enough temperature to provide sufficient temperature difference at the cold end of the heat exchanger. The resulting stream S118 exiting valve V101 is the coldest part of the process, and the optimization has constrained this temperature to be greater than the freezing point of $CO_2$. This stream S116 is only a small amount of the total flow of stream S115, about 6.6%, to open the heat exchanger cooling curve at the cold end. The rest, in stream S117, is maintained at the column pressure of 41 bar. Part of stream S115 may also be at a third pressure (not shown) to further optimize the performance of the heat exchanger HX100, thereby reducing the subsequent power for recompression, but this was not required in this case.

The difference between the inventive embodiment depicted in FIG. 3 and the background example of FIG. 2 is that in FIG. 3 stream S117 is withdrawn from the exchanger HX100 mid-way through warming, entering HX100 at −7.9° C. and leaving at 4.4° C. The temperature at which the stream is withdrawn from HX100 is determined by the requirement for a liquid $CO_2$ stream to wash nitrogen from the overhead vapor in column C103. The lower this temperature, the more liquid is available for washing in C103. Stream S140, withdrawn from HX100 at 4.4° C., is separated into a liquid fraction (stream S142) and a vapor fraction (S141) by phase separation in vessel C105. Although separator C105 is referred to herein as a phase or flash separator, a distillation column having multiple stages may be used as well. Stream S141 is returned to HX100 and is warmed to give stream S121, which is part of the product $CO_2$ stream S122. Liquid stream S142 is returned to HX100 to be cooled to −49° C. before being pumped via P101 (to overcome pressure losses and static head) and fed to the top of column C103, where it is used to wash nitrogen from the overhead vapor stream in column C103. In this manner, the nitrogen composition of the first helium-enriched stream S106 is reduced to levels below those achievable in a stripping column like that depicted in FIG. 2.

Compressors K101 and K100 are used in the embodiment shown in FIG. 3, first to recompress the recycled stream S109 exiting the PSA A100, second to compress the low pressure warmed $CO_2$ stream S120 to the pressure of the higher pressure stream S121, and then finally for compression to the product pressure (these two stages of compression are shown as one machine K100 with an intermediate feed stream in FIG. 3).

The products from the process of FIG. 3 are the $CO_2$ product stream S122, which contains substantially all of the $CO_2$ from feed S100, and a crude helium product stream S108 that can be further purified and liquefied to produce a pure helium stream. The performance of the wash column cycle of FIG. 3 is summarized in Table 2.

Table 2 shows that the wash column cycle of FIG. 3 with the Low $N_2$ Feed is comparable in power consumption with the stripping column cycle of FIG. 2, but it results in helium compositions in streams S106 and S108 around double those of FIG. 2, indicating the potential benefits to the downstream purification and liquefaction process. However, it is at the High $N_2$ Feed conditions where the benefits are more noticeable, with the wash column cycle of FIG. 3 showing only a slight power increase at these conditions without the noticeable reduction in performance seen in the High $N_2$ Feed examples of FIG. 2. Table 2 also shows that an intermediate reboiler can be used with the wash column of FIG. 3 (similar to the intermediate reboiler depicted in FIG. 2), resulting in about a 10% reduction in power consumption but adding the extra complexity involved in incorporating an intermediate reboiler.

Figure 4:
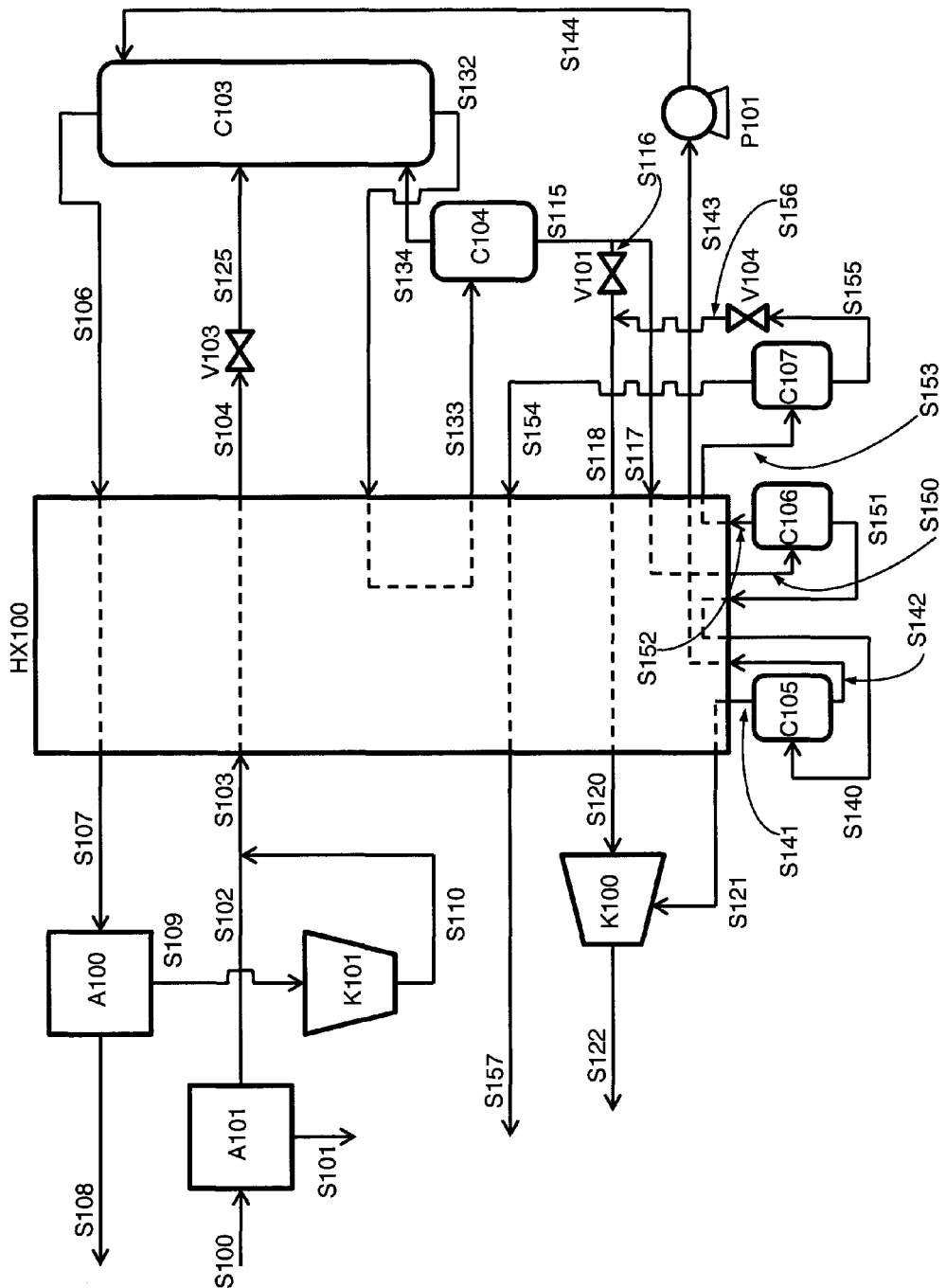
FIG. 4 is a schematic diagram of an embodiment of the invention incorporating a distillation column with a $CO_2$ wash stream and nitrogen rejection.

Additional embodiments of the systems and methods of the present invention incorporate rejection of nitrogen from the helium-depleted $CO_2$ product stream, particularly in the case of scenarios in which the feed is similar to the High $N_2$ Feed, in order to reach a given $CO_2$ specification (in this case 95% $CO_2$ in the product stream S122). An embodiment of the process incorporating nitrogen rejection is shown in FIG. 4. FIG. 4 differs from the wash column cycle of FIG. 3 by the separators C106 and C107 used to flash more volatile components, particularly nitrogen, from the product $CO_2$. The washing process in FIG. 3 has the effect of reducing nitrogen in the first helium-enriched stream S106, which forces the nitrogen into the bottom stream S115. The process of FIG. 4 allows that nitrogen to be separated from the $CO_2$.

In FIG. 4, the features that are the same as in FIGS. 1 through 3 have been labeled with the same reference numerals. The feed stream S100 has the composition shown in Table 1. In the embodiment depicted in FIG. 4, only the high $N_2$ feed composition is considered, as it is this feed composition that requires increasing the $CO_2$ product purity to a concentration above that in the feed stream. The feed stream S100 is dried in TSA A101 and combined with the compressed offgas from PSA A100 in stream S110. Combined stream S103 is then cooled in heat exchanger HX100 to give stream S104 at −46° C., at which point the stream has mostly been liquefied (the liquid fraction is around 97.3%). Stream S104 is then dropped in pressure via valve V103 to reach the operating pressure of the column C103, which in this case is 39 bar, to give stream S125. S125 is then fed to a stage within C103 determined to be the optimum location; in this case stream S125 enters onto the 6th theoretical stage from the top of the column C103. C103 is a packed or trayed distillation column designed to allow vapor/liquid contacting, as is well known in the art. In this case, C103 has been modeled with 15 theoretical stages, although more or fewer could easily be used to effect this separation.

Since the exemplary process depicted in FIG. 4 is focused on the High $N_2$ Feed composition (although the process of FIG. 4 could be employed with a low $N_2$ feed, a high $N_2$ feed, or a feed having an intermediate $N_2$ composition), and as discussed above the intermediate reboiler does not have a great impact with the High $N_2$ Feed stream, the wash column process in FIG. 4 has been modeled with nitrogen rejection and only one main reboiler. The main reboiler is as discussed in the description of FIG. 3. The liquid stream from the bottom stage of C103, stream S132, is at −46.4° C. and is heated and partially vaporized in HX100 to −27.5° C. The two-phase stream from HX100, stream S133, is separated in C104 into a liquid fraction, stream S115, and a vapor fraction stream S134 that is returned to column C103 to provide the upwards-flowing vapor stream required by the distillation process.

Some of the refrigeration required to condense the feed stream S100 is provided by the reboiler for column C103, but most of the refrigeration comes from reheating the helium-lean liquid stream S115 exiting phase separator C104. Stream S115 is split into a number of streams that are warmed in HX100. The streams into which stream S115 are divided provide refrigeration at different pressure, and therefore temperature, levels. The split between these streams and the pressure to which they are reduced or pumped is determined so as to optimize the process.

In this case some of this liquid, in stream S116, is dropped in pressure through valve V101 to 8.1 bar so that it boils at a cold enough temperature to provide sufficient temperature difference at the cold end of the heat exchanger HX100. This stream S118 after valve V101 is the coldest part of the process, and the optimization has constrained this temperature to be greater than the freezing point of $CO_2$. This stream is only a small amount of the total flow of stream S115, about 3.6%, due to the fact that some of the higher pressure $CO_2$ is recycled to this point once nitrogen has been stripped from stream S117, thereby making up the difference to produce the refrigeration at the cold end of the process. The rest of stream S115, in stream S117, is maintained at the column pressure of 39 bar.

The difference between the embodiments depicted in FIG. 4 and FIG. 3 is that stream S117 is warmed in heat exchanger HX100 to only −13° C. in the system of FIG. 4. Stream S150, withdrawn from HX100 at −13° C., is separated into a liquid fraction (stream S151) and a vapor fraction (stream S152) fraction by phase separation in separator C106. Although separator C106 is referred to herein as a phase or flash separator, a distillation column having multiple stages may be used as well. The purpose of this section of the process is to reject nitrogen from the $CO_2$ product stream. Stream S150 comprises about 4.1% nitrogen, whereas the vapor stream leaving separator C106 comprises about 29.2% nitrogen, or a little more than a third of the nitrogen that was in stream S150 prior to separation in C106.

Stream S151 is then returned to HX100, where it is warmed and withdrawn as stream S140 at 1.1° C. and is separated into a liquid fraction (stream S142) and a vapor fraction (stream S141) in vessel C105. Stream S141 is returned to HX100 and is warmed to give stream S121, part of the product $CO_2$ stream S122. Liquid stream S142 is returned to HX100 to be cooled to −46° C. before being pumped via pump P101 (to overcome pressure losses and static head) and fed to the top of column C103, where it is used to wash nitrogen from the overhead vapor stream, thus reducing the nitrogen composition of the first helium-enriched stream S106 to levels below that achievable in the stripping column of FIG. 2.

The nitrogen-enriched vapor stream S152 from separator C106 is then returned to HX100 to be re-cooled to condense $CO_2$ from the stream, increase the concentration of nitrogen in the vent stream, and minimize losses of $CO_2$ in the nitrogen vent. This cooled stream S153 leaves HX100 at −49° C., wherein 65% of stream S153 is in the liquid phase.

In separator C107, stream S153 is separated into a nitrogen-enriched vapor stream S154 and a liquid stream S155. The nitrogen enriched stream S154 comprises 73.0% nitrogen and 25.0% $CO_2$. The 25.0% $CO_2$ composition in stream S154 is a limit placed upon the process and imposed by the use of a constraint within the process optimizer. This value, which represents a loss of $CO_2$ from the process of less than 1%, can be altered by changing temperatures and pressures within the process. Alternatively, some or all of the $CO_2$ in this vent stream S154 could be recovered using well-known adsorption, absorption or membrane systems to return the process to close to 100% $CO_2$ recovery.

The nitrogen-enriched stream S154 is then warmed within HX100 and vented from the process as stream S157. The liquid stream S155 from separator C107 is reduced in pressure via valve V104 to the pressure of stream S118 and combined to make up the rest of the low pressure $CO_2$ required for the cold end refrigeration duty, as mentioned previously.

Compressors K101 and K100 are used, first to recompress the recycled stream S109, second to compress the low pressure warmed $CO_2$ stream S120 to the pressure of the higher pressure stream S121, and then finally for compression to the product pressure (these two stages of compression are shown as one machine K100 with an intermediate feed stream in FIG. 4).

The products from the process depicted in FIG. 4 are: (1) the $CO_2$-rich product stream S122, with the $CO_2$ composition increased to 95% from the feed composition of 92.38% (Stream S122 contains nearly all of the $CO_2$ from feed S100, less the small amount lost with the nitrogen vent stream S157); (2) a crude helium product stream S108 that can be further purified and liquefied to produce a pure helium stream; and (3) a nitrogen-rich vent stream S157. When nitrogen rejection is employed, the resulting nitrogen vent stream S157 may contain some residual $CO_2$. This $CO_2$ can be easily recovered using a variety of well known processes such as absorption, adsorption, or membrane separation systems.

The performance of the process of FIG. 4, incorporating a $CO_2$ wash and nitrogen rejection, is summarized in Table 2. As shown in Table 2, the power consumption has increased with the addition of the nitrogen rejection, from 2.37 MW to 2.96 MW; $CO_2$ recovery has reduced from 100% to 99.1% due to the loss of $CO_2$ in the nitrogen vent, and the product $CO_2$ composition has been increased to meet the required value of 95.0% from the previous value of 92.74%.

Examining the results in Table 2, one can see that the wash column cycle, with or without nitrogen rejection, reaches a helium purity in stream S108, after $CO_2$ recovery from the first helium-enriched stream S106/S107, of greater than 90%. In the scenario embodied in FIG. 4, with nitrogen rejection, stream S108 comprises 92.52% helium, 5.7% nitrogen, and 1.7% hydrogen (hydrogen is a light component and around two thirds of the hydrogen in the feed stream S100 ends up in this stream), plus 394 ppm methane and 361 ppm argon.

It was found that it is possible to design the PSA system A100 to remove substantially all of the nitrogen and argon as well as $CO_2$ from the product helium stream S108. However, to remove hydrogen, a catalytic combustor R100 is required, as shown in the embodiment depicted in FIG. 5. The catalytic combustor R100 may be a unit employing a palladium- or platinum-containing catalyst, or any other catalyst suitable for the combustion of hydrogen and trace hydrocarbons. The combustion needs a source of oxygen, which can be air, oxygen enriched air, or oxygen. In this case, air was added and controlled in the optimization so that there was a small excess of oxygen over that required by combustion. As a result, the amount of air added was controlled to give 100 ppm oxygen in the converted stream S160 exiting the combustor R100. The hydrogen- and methane-free stream S160 is then purified in PSA A100 to give a pure helium stream S161 and an offgas stream S109. Unlike in the previous examples, stream S109 contains minor amounts of oxygen, which typically is not detrimental as it is a minor component, and water as a product of the oxidation reactions that take place in R100. It therefore makes sense that the recycle stream S110 from the PSA A100 should be recovered to a point upstream of the water removal TSA A101 so as not to introduce water into the low temperature process, which could freeze or form solid $CO_2$ hydrates and create a blockage in heat exchanger HX100, although the recycle stream could also be dried separately.

Figure 5:
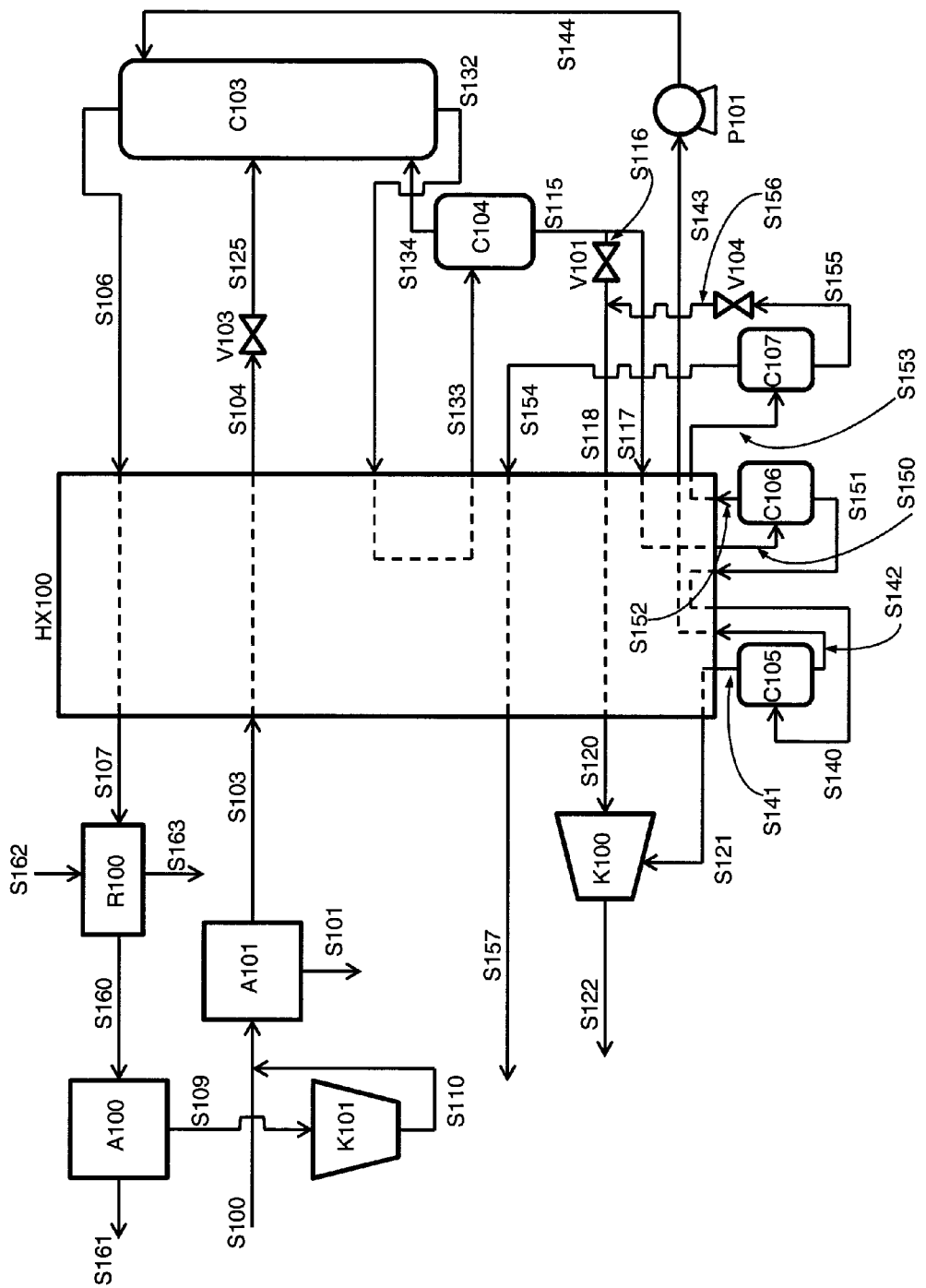
FIG. 5 is a schematic diagram of an embodiment of the invention incorporating catalytic combustion to increase helium purity in the helium product stream.

Table 2 shows the results of the process embodied in FIG. 5, where helium product stream S161 now comprises 100% helium and there is no requirement for further purification before the helium can be liquefied. The products from the process in FIG. 5 are therefore: (1) the $CO_2$-rich product stream S122, with a $CO_2$ composition increased to 95% from the feed composition of 92.38% (Stream S122 contains nearly all of the $CO_2$ from feed stream S100, less the small amount lost with the nitrogen vent stream S157); (2) a pure helium product stream S161, which can be liquefied without further purification to produce the product pure helium stream; and (3) a nitrogen-rich vent stream S157.

Note that a nitrogen vent stream is not required in order to obtain a pure helium product. For example, a pure helium product can be produced from the process described in FIG. 3 (with modifications as described above such as a catalytic combustor and related improvements to the PSA) for situations in which nitrogen rejection is not necessary, for instance with low nitrogen in the feed stream or a lower product $CO_2$ purity requirement.

Further, the PSA design depicted in FIG. 5 as described above may be incorporated into other configurations of the process, and such configurations are considered within the scope of the present invention. For example, a catalytic combustor and PSA may be employed to improve the double flash cycle depicted in FIG. 1 or the stripping column configuration depicted in FIG. 2.

Figure 6:
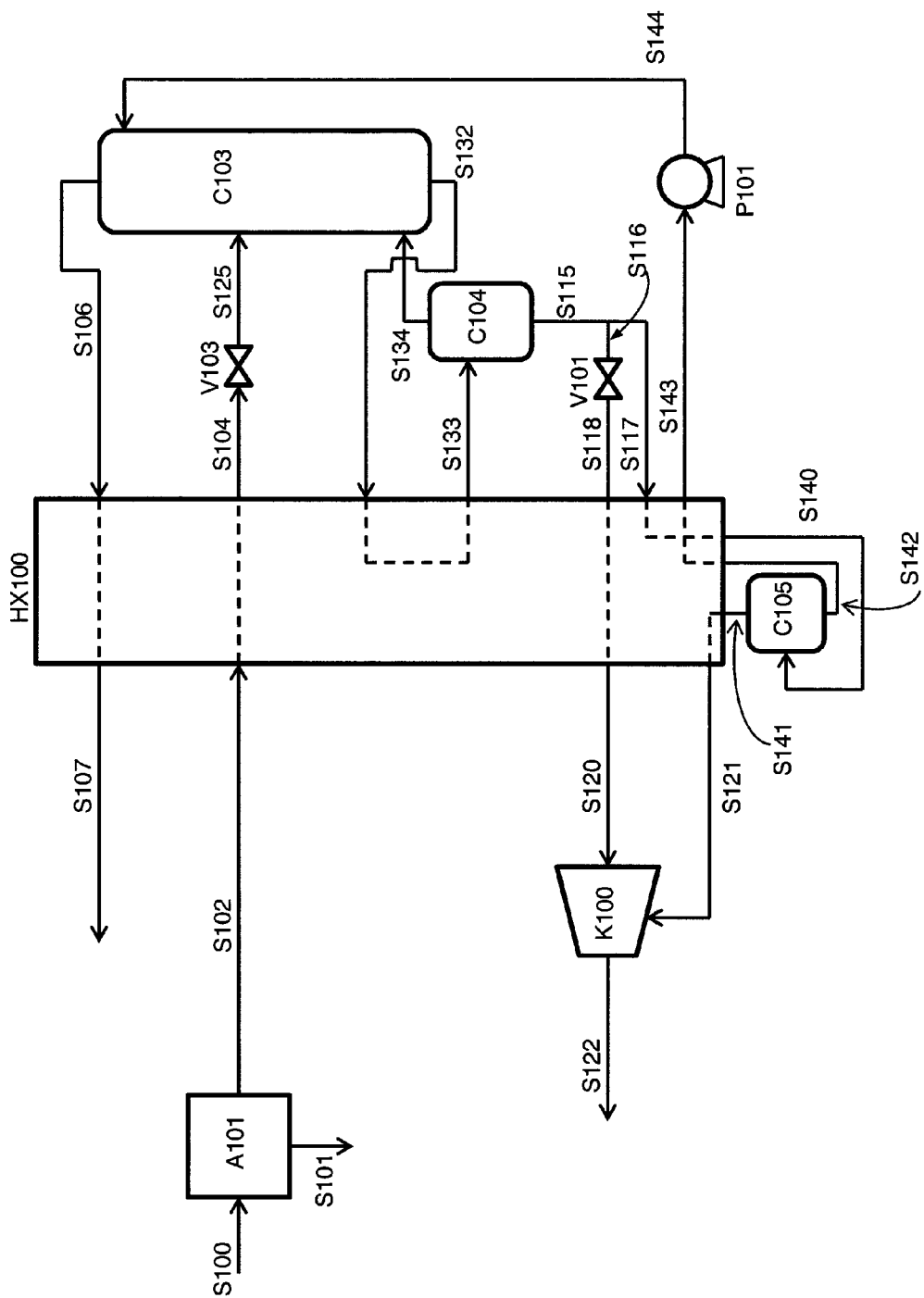
FIG. 6 is a schematic diagram of an embodiment of the invention incorporating a distillation column with a recycle $CO_2$ wash stream without additional helium purification downstream of the distillation column.
Figure 7:
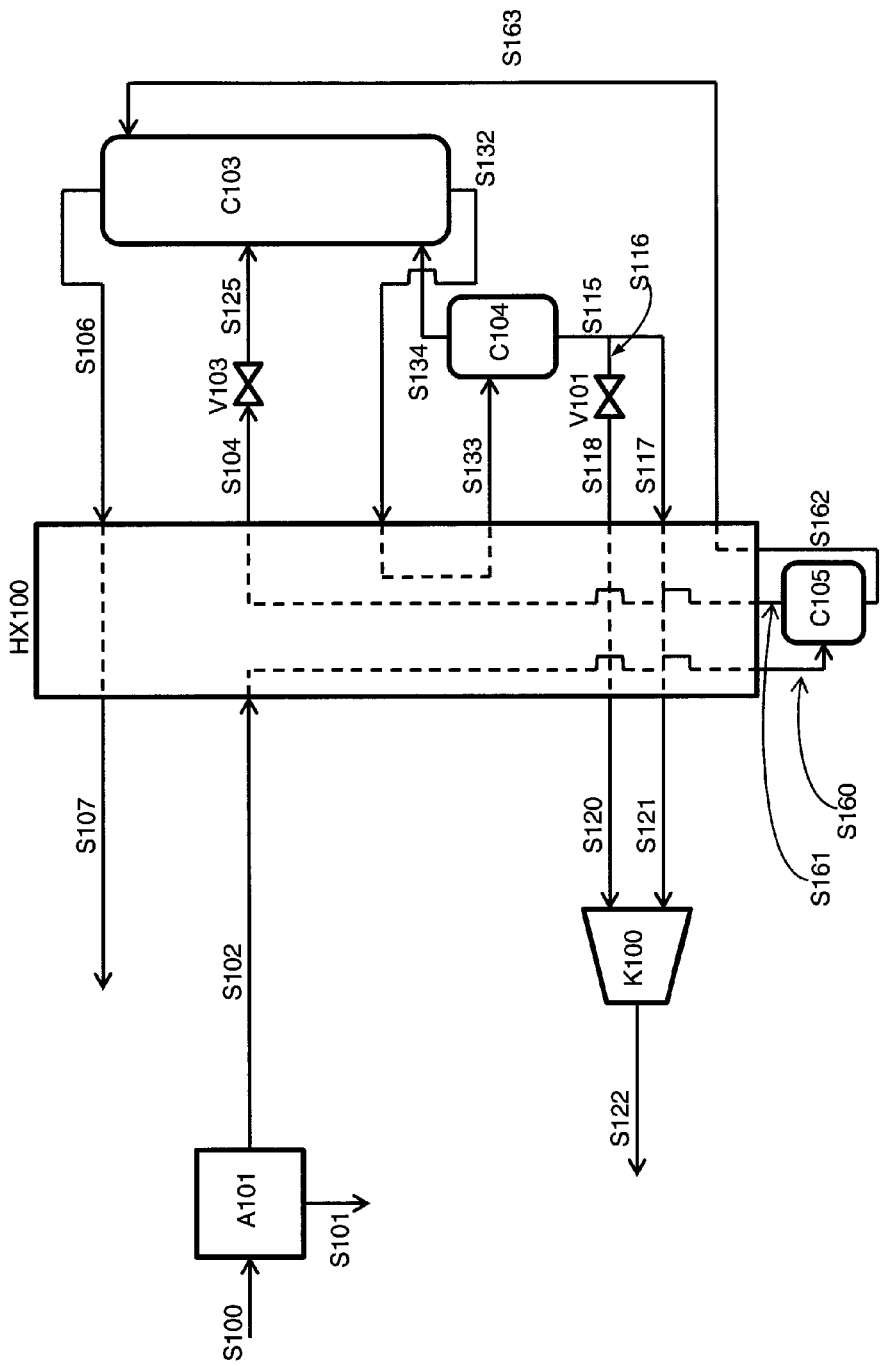
FIG. 7 is a schematic diagram of an embodiment of the invention incorporating a distillation column with a $CO_2$ wash stream derived from the feed stream without additional helium purification downstream of the distillation column.

Also note that, in embodiments of the invention that incorporate a $CO_2$ wash in the distillation column, it is possible to omit the PSA entirely and still achieve a desired level of helium purity. For example, two such possible configurations are shown in FIGS. 6 and 7, which incorporate a recycle $CO_2$ wash and a feed $CO_2$ wash (respectively). In FIGS. 6 and 7, the features that are the same as in FIGS. 1 through 5 have been labeled with the same reference numerals. The process depicted in FIG. 6 is the same as that shown in FIG. 3 and previously described, except that helium-enriched stream S107 is not separated or purified downstream after exiting heat exchanger HX100 and is instead recovered directly as a product.

Similarly, in the process depicted in FIG. 7, helium-enriched stream S107 is recovered directly as a product. In FIG. 7, however, the $CO_2$ wash stream fed to column C103 is derived from the feed stream S100 rather than from a recycle stream. As shown in FIG. 7, the dried feed stream S102 is partially cooled in heat exchanger HX100. This partially cooled stream S161 is then separated into a liquid fraction (stream S162) and a vapor fraction (S161) by phase separation in vessel C105. Although separator C105 is referred to herein as a phase or flash separator, a distillation column having multiple stages may be used as well. Stream S161 is returned to HX100 and is further cooled to a temperature at which the stream has been mostly liquefied to give stream S104. Liquid stream S162 is also returned to HX100 to be further cooled, forming $CO_2$ wash stream S163. Stream S163 is fed to the top of column C103, where it is used to wash nitrogen from the overhead vapor stream in column C103.

Benefits of the systems and methods described herein include, but are not limited to, one or more of the following: (1) removal of both $CO_2$ and $N_2$ from the overhead helium-enriched stream exiting the stripping (or distillation) column, thereby increasing the helium composition and reducing the nitrogen composition of that stream while reducing the amount of nitrogen recycled form the PSA; (2) the option to use one or more separators in place of a distillation column; (3) the use of an optional intermediate reboiler in the distillation column to improve overall efficiency, especially when the $N_2$ concentration in the feed is low; (4) recycle of liquid $CO_2$ to the top of the column as an optional $CO_2$ wash, which strips $N_2$ from the overhead stream and reduces $N_2$ in the helium-rich overhead stream, instead moving it to the $CO_2$ product stream; (5) removal of methane and other higher hydrocarbons via an optional $CO_2$ wash, further eliminating impurities from the overhead enriched helium stream that would otherwise require removal in a cryogenic purification process; (6) rejection of nitrogen to increase the composition of $CO_2$ in the product stream to meet pipeline requirements (note that the nitrogen rejection and $CO_2$ aspects may be used together to provide improved results); and (7) catalytic combustion of hydrogen and hydrocarbons in the helium-enriched stream (with the addition of air or oxygen) to remove impurities in the helium product stream.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application for all jurisdictions in which such incorporation is permitted.

Certain embodiments and features of the invention have been described using a set of numerical upper limits and a set of numerical lower limits. For the sake of brevity, only certain ranges are explicitly disclosed herein. However, it should be appreciated that ranges from any lower limit to any upper limit are contemplated unless otherwise indicated. Similarly, ranges from any lower limit may be combined with any other lower limit to recite a range not explicitly recited, and ranges from any upper limit may be combined with any other upper limit to recite a range not explicitly recited. Further, a range includes every point or individual value between its end points even though not explicitly recited. Thus, every point or individual value may serve as its own lower or upper limit combined with any other point or individual value or any other lower or upper limit, to recite a range not explicitly recited. All numerical values are "about" or "approximately" the indicated value, and take into account experimental error and variations that would be expected by a person having ordinary skill in the art.

In certain of the following claims, letters are used to identify claimed steps (e.g., a., b., c., etc.). These letters are used to aid in referring to the method steps and are not intended to indicate the order in which the claimed steps are performed, unless and only to the extent that such order is necessary for operability of the invention or specifically recited in the claims.

While the foregoing is directed to embodiments of the invention and alternate embodiments thereof, various changes, modifications, and alterations from the invention may be contemplated by those skilled in the art without departing from the intended spirit and scope thereof. It is intended that the present invention only be limited by the terms of the appended claims.

The invention claimed is:

1. A method for recovering helium from a feed stream comprising helium, at least 50 mol % carbon dioxide, and one or more intermediate components having volatilities between those of carbon dioxide and helium, the method comprising:
    (a) cooling the feed stream;
    (b) separating the feed stream into a first helium-enriched stream and a first $CO_2$-enriched stream in a distillation column;
    (c) feeding a liquid stream comprising $CO_2$ to the top of the distillation column, thereby washing at least a portion of the one or more intermediate components into the first CO2-enriched stream; and
    (d) separating the first helium-enriched stream to form a helium-rich product stream and a helium-lean stream, wherein the concentration of at least one of the intermediate components in the helium-rich product stream is lower than its concentration in the feed stream, wherein at least part of the separation in step (b) is effected by contacting a vapor with a liquid, wherein at least part of the feed stream enters the distillation column at an intermediate stage, and wherein the temperature at the coldest part of method steps (a) through (d) is greater than $-56.6°$ C.

2. The method of claim 1, wherein at least part of the method takes place at a temperature below ambient temperature.

3. The method of claim 1, further comprising the steps of:
    (e) splitting the first $CO_2$-enriched stream into two or more derivative $CO_2$-enriched streams;
    (f) heating at least one of the two or more derivative $CO_2$-enriched streams; and
    (g) compressing and combining the two or more derivative $CO_2$-enriched streams to form a $CO_2$-rich product stream.

4. The method of claim 1, wherein the feed stream is dried to a water dew point of less than or equal to $-40°$ C. prior to cooling the feed stream.

5. The method of claim 1, wherein the helium-lean stream is recycled and fed to the distillation column.

6. The method of claim 5, wherein the recycled helium-lean stream is combined with the feed stream before being fed to the distillation column.

7. The method of claim 1, wherein the feed stream is separated in step (b) in a distillation column having a first reboiler, wherein a first liquid stream is withdrawn from the bottom of the distillation column, heated and at least partially vaporized, and at least the vapor portion of the heated first liquid stream is returned to the bottom of the distillation column.

8. The method of claim 3, further comprising separating at least one of the two or more derivative $CO_2$-enriched streams into a liquid fraction and a vapor fraction and feeding the liquid fraction to the top of the distillation column.

9. The method of claim 8, wherein the derivative $CO_2$-enriched stream is heated prior to separating the stream into the liquid fraction and the vapor fraction and wherein the liquid fraction is cooled prior to entering the top of the distillation column.

10. The method of claim 1 or claim 9, wherein the helium-rich product stream comprises at least 90 mol % helium.

11. The method of claim 1, wherein the helium-rich product stream comprises at least 60 mol % helium.

12. The method of claim 3, wherein the $CO_2$-rich product stream comprises at least 90 mol % $CO_2$.

13. The method of claim 1, wherein the feed stream comprises a gas.

14. The method of claim 1, wherein the feed stream comprises a liquid.

15. The method of claim 1, wherein the feed stream comprises a supercritical fluid.

16. The method of claim 1, wherein the pressure of the feed stream is greater than about 35 bar.

* * * * *